PRESELECTED SPEED COMMAND GENERATOR

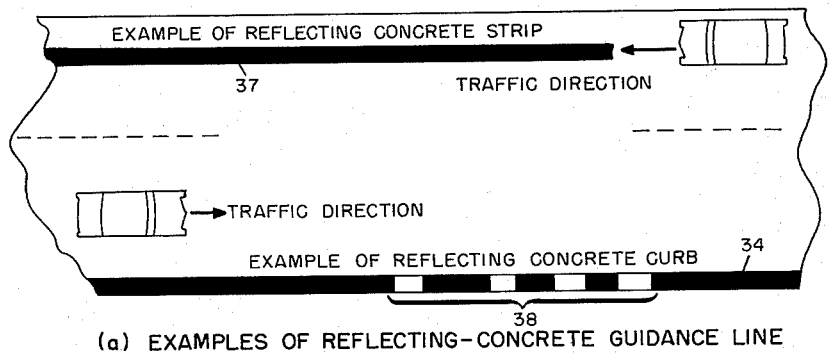
(a) EXAMPLES OF REFLECTING-CONCRETE GUIDANCE LINE
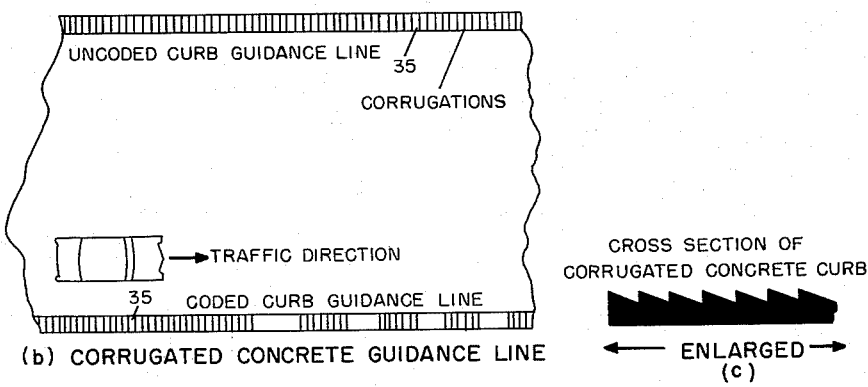
(b) CORRUGATED CONCRETE GUIDANCE LINE
(c) ENLARGED — CROSS SECTION OF CORRUGATED CONCRETE CURB
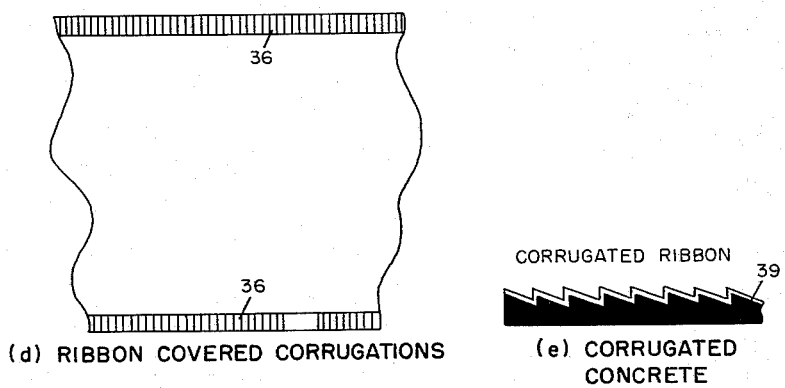
(d) RIBBON COVERED CORRUGATIONS
(e) CORRUGATED CONCRETE
FIG 2

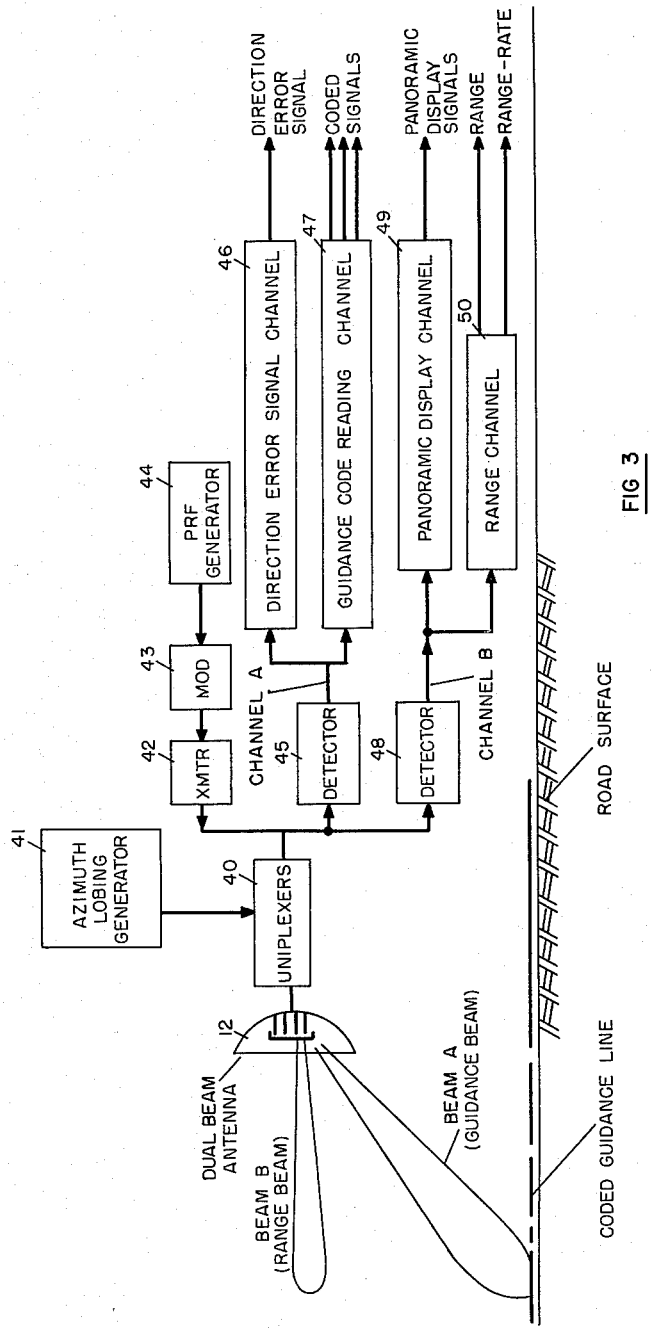

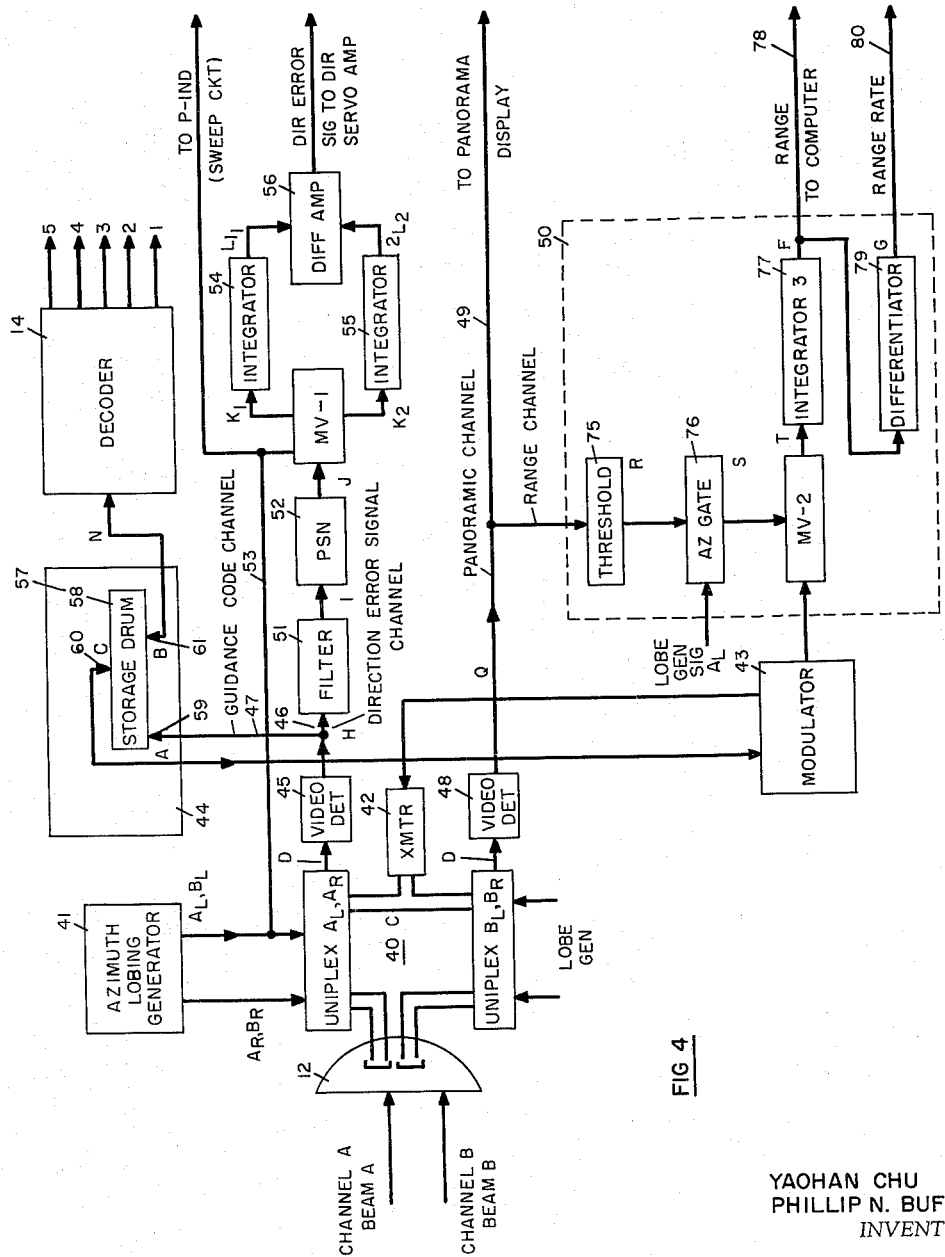

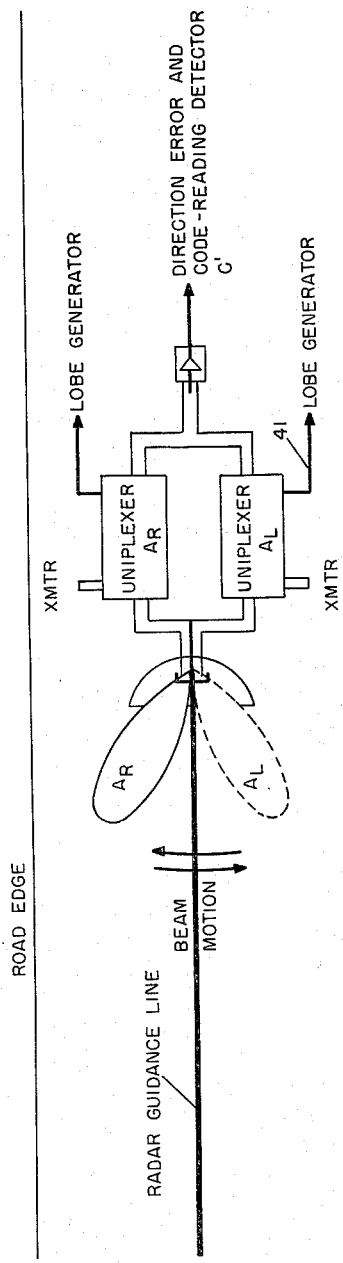
FIG 5 (a) BEAM A CHANNEL
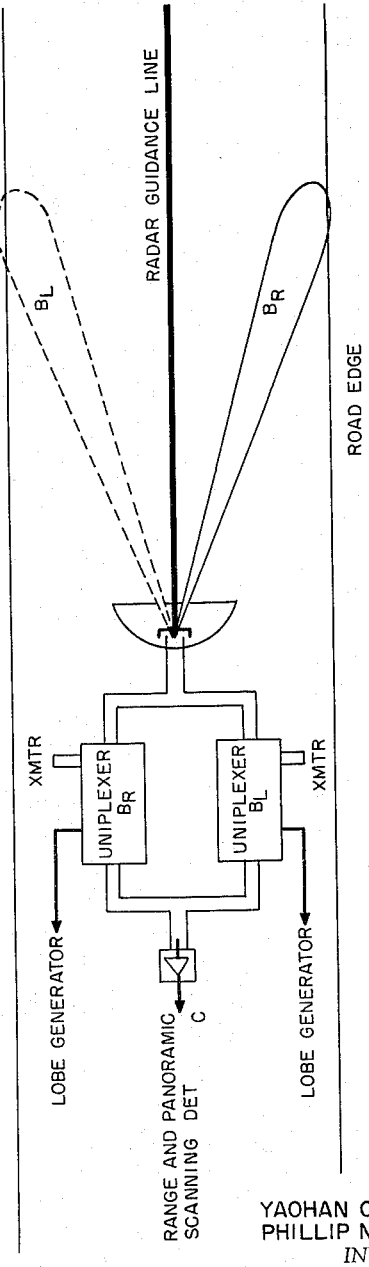
FIG 5 (b) BEAM B CHANNEL

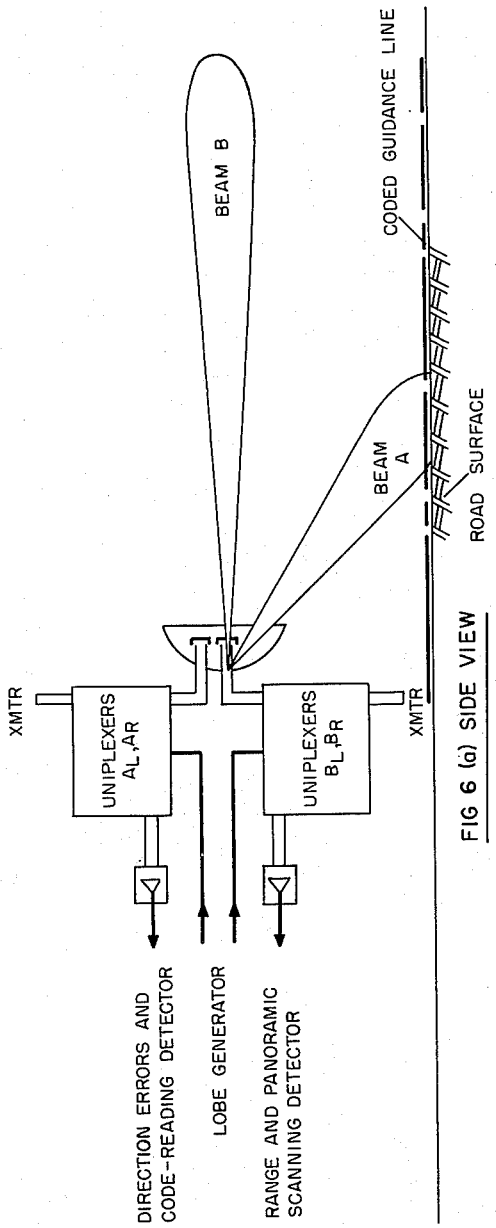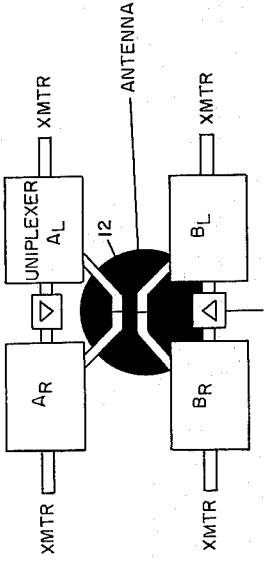

SPEED COMMAND SELECTION CIRCUIT

YAOHAN CHU
PHILLIP N. BUFORD
*INVENTORS*

Aug. 15, 1961 YAOHAN CHU ET AL 2,996,137
AUTOMATIC RADAR GUIDED AND COMPUTER CONTROLLED VEHICLES
Filed Jan. 29, 1958 17 Sheets-Sheet 17

YAOHAN CHU
PHILLIP N. BUFORD
INVENTORS

BY
*Moore & Hall*
ATTORNEYS

United States Patent Office
2,996,137
Patented Aug. 15, 1961

2,996,137
AUTOMATIC RADAR GUIDED AND COMPUTER CONTROLLED VEHICLES
Yaohan Chu, 6904 Calverton Drive, Hyattsville, Md., and Phillip N. Buford, 3419 Tulane Drive, West Hyattsville, Md.
Filed Jan. 29, 1958, Ser. No. 712,035
25 Claims. (Cl. 180—82.1)

The present invention relates to vehicles having means for automatic control, and is particularly concerned with an automatic system providing speed and direction control of a land vehicle, as well as advisory and warning indications usable for steering and safety purposes.

The system to be described is particularly suitable for vehicles operated on limited access turnpikes or superhighways in which driving for a long distance may become monotonous and may cause the driver to become fatigued. The system is characterized by the fact that it provides automatic direction and speed control under all weather conditions; permits for push-button automatic speed control with a driver's override control over said automatic control; provides for automatic direction control, again with driver's override control of said direction control; provides for range, and closing rate indications; gives automatic indications of impending collision, and warning indications of special road conditions ahead, such as intersections, bridges, railroads, and the like; and also provides a panoramic display of general road conditions.

As will become apparent from the subsequent description, the present invention thus comprises a novel arrangement of detection and control which can be associated with a moving land vehicle, whereby said vehicle can be permitted to operate over fairly long distances automatically, with provision being made to constantly apprise the driver of the automobile of road conditions and obstacles during said automatic operation; and with further provision being made for a driver's override of the said automatic control, whereby manual operation can be substituted for said automatic control, as may become necessary and desirable under various conditions encountered.

Various systems have been suggested in the past for providing automatic warning and/or control operations on a land vehicle such as an automobile. The present invention is directed toward an improved form of such control and warning structure employing a radar apparatus operative to detect road conditions and/or to detect guidance and coding structures pre-located on, or comprising a portion of, the road; and said radar apparatus includes means generating appropriate signals which, in conjunction with other signals generated by the vehicle itself, can effect the desired indications and automatic vehicle control already mentioned. In this respect, one of the important features of the present invention resides in the provision of a novel system for vehicle guidance, preferably employing a radar syystem carried by the vehicle, cooperating with guidance means disposed on or comprising a portion of the road, whereby automatic steering of the said vehicle can be effected over long distances without requiring a driver's attention; but with provision always being made for a driver's override of said automatic guidance (and of the speed control to be described), if such override appears warranted.

It is accordingly an object of the present invention to provide an improved automatic system for land vehicles characterized by the provision of automatic direction control with driver's override control.

A further object of the present invention resides in the provision of an automatic land vehicle providing automatic speed control with driver's override control.

Another object of the present invention resides in the provision of an automatic system for control of land vehicles, which system includes interaction between the direction and speed controls whereby, under certain conditions of operation, the control of a vehicle may be taken over by the direction control apparatus.

Another object of the present invention resides in the provision of an automatic system for land vehicles which includes indicator means for providing an automatic range indication of vehicles ahead of the control vehicle as well as an automatic closing rate indication of such other vehicles as may be present.

A still further object of the present invention resides in the provision of an automatic system for land vehicles which provides automatic advisory and warning indications as to road conditions, including intersections, merging lanes, bridges, exits, and driving requirements such as speed limits and the like.

A further object of the present invention resides in the provision of an automatic system for land vehicles which includes means providing a panoramic display of road and traffic conditions, such as vehicles and obstacles ahead of and along the same and adjacent lanes of the highway, faults in the roadway surface, and bridge abutments.

A further object of the present invention resides in the provision of an automatically controlled vehicle wherein said automatic control is effected under all weather conditions including rain, fog, snow, or wind, and under conditions of both daylight and darkness.

Still another object of the present invention resides in the provision of an improved radar system adapted to be employed on land vehicles for effecting automatic guidance and speed control, as well as for providing automatic indications and warning signals.

A still further object of the present invention resides in the provision of an improved automatically controlled vehicle in conjunction with a novel road surface; and in particular, in conjunction with improved guidance structures and guidance lines, for use on such road surfaces, for cooperating with radiations emanating from an automatically controlled vehicle constructed in accordance with the present invention.

Still another object of the present invention resides in the provision of improved guidance line structures for use on roadways.

Another object of the present invention resides in the provision of a vehicle having computer means thereon, adapted to process and interpret a plurality of signals thereby to produce further signals effecting control, preferably automatic control, of the direction and/or speed of said vehicle.

A still further object of the present invention resides in the provision of improved radar apparatus for use in conjunction with an automatically controlled vehicle, so constructed and arranged that forward or side scattering of a radar beam emanating from said vehicle is prevented or materially reduced. In this respect, the present invention is particularly concerned with radar systems so constructed and arranged that interference with the radar systems of nearby or approaching traffic is prevented; and so that radar energy, which is back scattered to the particular vehicle illuminating the roadway, is intensified.

A further object of the present invention resides in the provision of improved radar systems for use on automatically controlled vehicles, so constructed and arranged as to provide error signals, as a result of steering errors, as well as the generation of automatic steering signals; reading of guidance line codes or special code lines, and the translation of such code lines into warning signals or traffic information signals; the determination and indication of range and closing rate between a vehicle carrying said radar equipment and vehicles ahead; the presentation of a visual panoramic display of the terrain, fixed objects and other moving vehicles in advance of the vehicle; the generation of oral or visual indications warning the driver of an automobile of impending collisions with other vehicles; and the generation of still other signals communicating, to the vehicle operator, warning or advisory information obtained from a coded roadway code line.

Still another object of the present invention resides in the provision of improved FM or pulse radar transmitter-receiver devices adapted to operate on a time-sharing basis between two or more channels, formed by different antennas and antenna feed and signal detection and modulation circuitry, whereby the overall radar arrangement is particularly adapted for use in the automatic guidance and speed control of vehicles.

Still another object of the present invention resides in the provision of an improved radar system, and particularly in the provision of an improved dual beam antenna for use in such system, whereby one beam may be employed for guidance purposes while another beam may be employed for purposes of ranging and panoramic display.

A still further object of the present invention resides in the provision of an improved method of obtaining range information by converting range measurement to time measurement, and by generation of closing rate information through differentiating range information.

A further object of the present invention resides in the provision of an improved method and apparatus for reading coded signals carried, for example, by a roadway.

Another object of the present invention resides, in general, in the provision of an automatically controlled vehicle; and with radar apparatus of improved form carried by said vehicle, whereby automatic control of said vehicle may be achieved with greater assurance of safety and accuracy of operation than has been possible by systems suggested heretofore.

The foregoing objects, advantages, construction and operation of the present invention will become more readily apparent from the following description and accompanying drawings, in which:

FIGURE 3 is a block diagram of one form of radar apparatus constructed in accordance with the present invention.

FIGURE 4 is a further block diagram of the arrangement shown in FIGURE 3, illustrating with greater particularity certain portions of the FIGURE 3 circuit.

FIGURES 5a and 5b comprise respectively plan views of dual beam antenna devices constructed in accordance with the present invention and illustrate, respectively, two different beam channels of a radar device constructed in accordance with the present invention.

FIGURES 6a, 6b and 6c represent other views of a dual beam antenna system constructed in accordance with the present invention.

Figure 7:
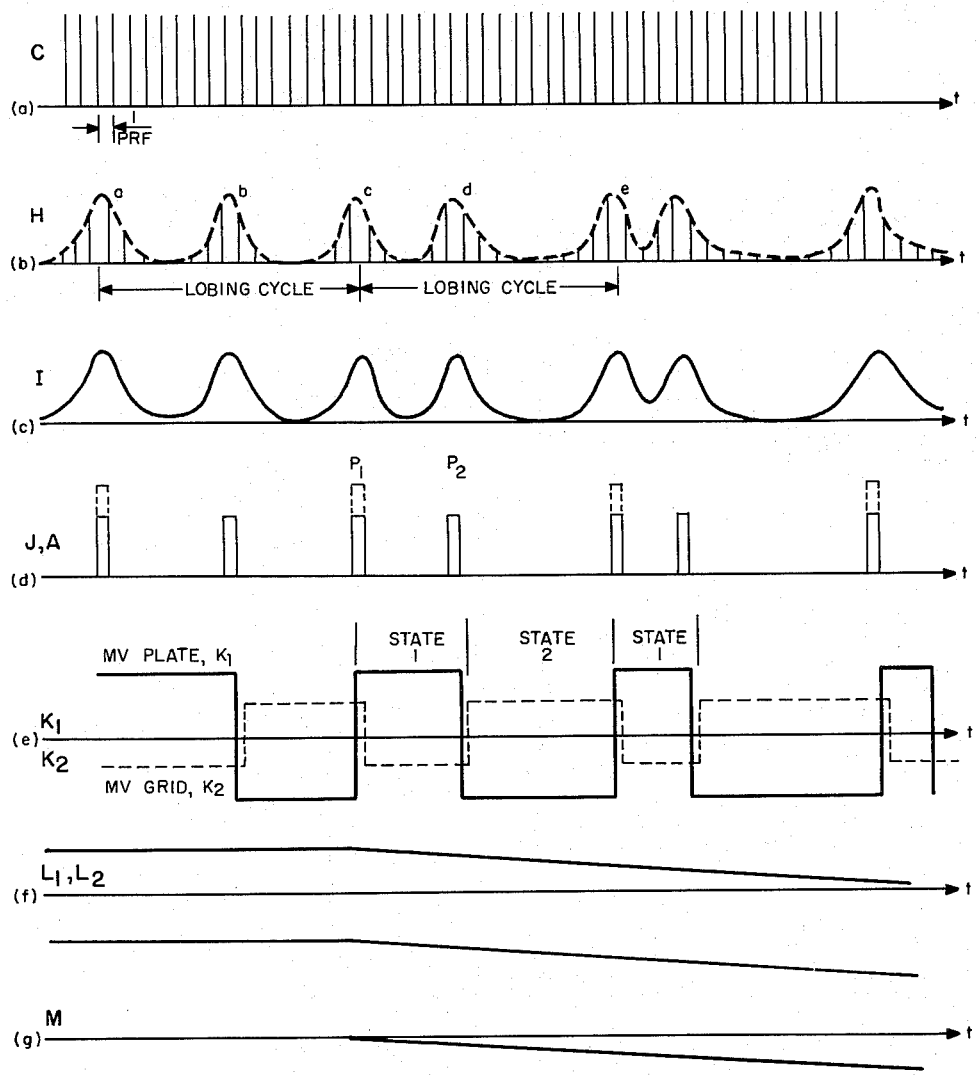

FIGURES 7 (a through g) are signal waveforms illustrating the operation of a direction error signal channel constructed in accordance with the present invention.

Figure 8:
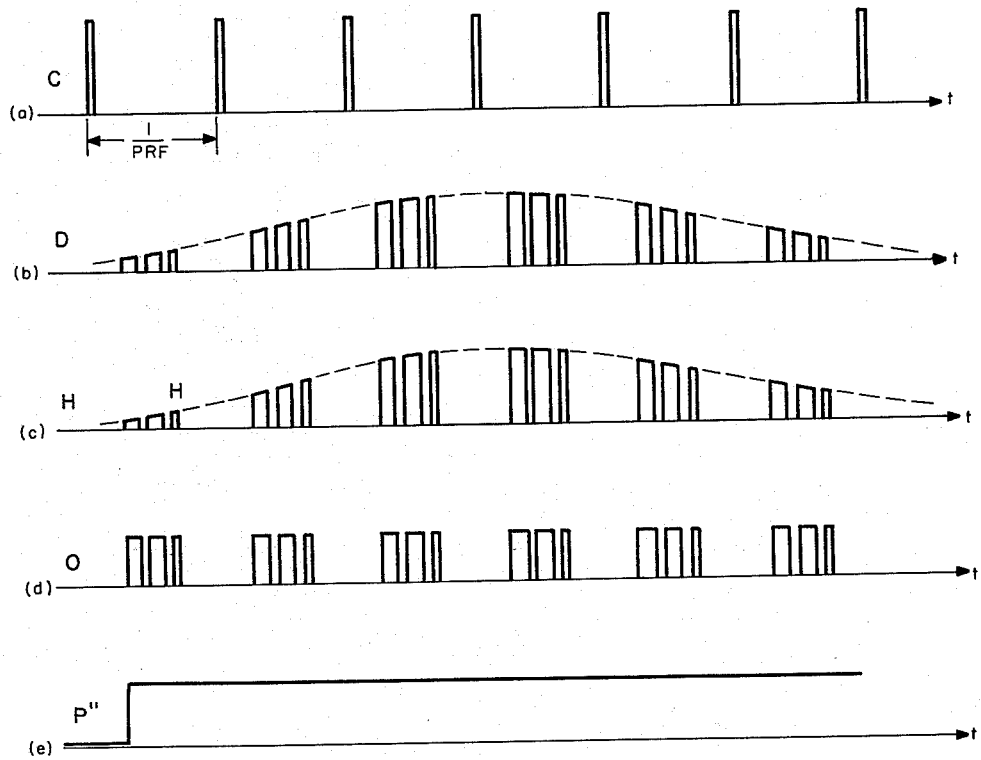

FIGURES 8 (a through e) are waveforms illustrating the operation of a code reading channel constructed in accordance with the present invention.

Figure 9:
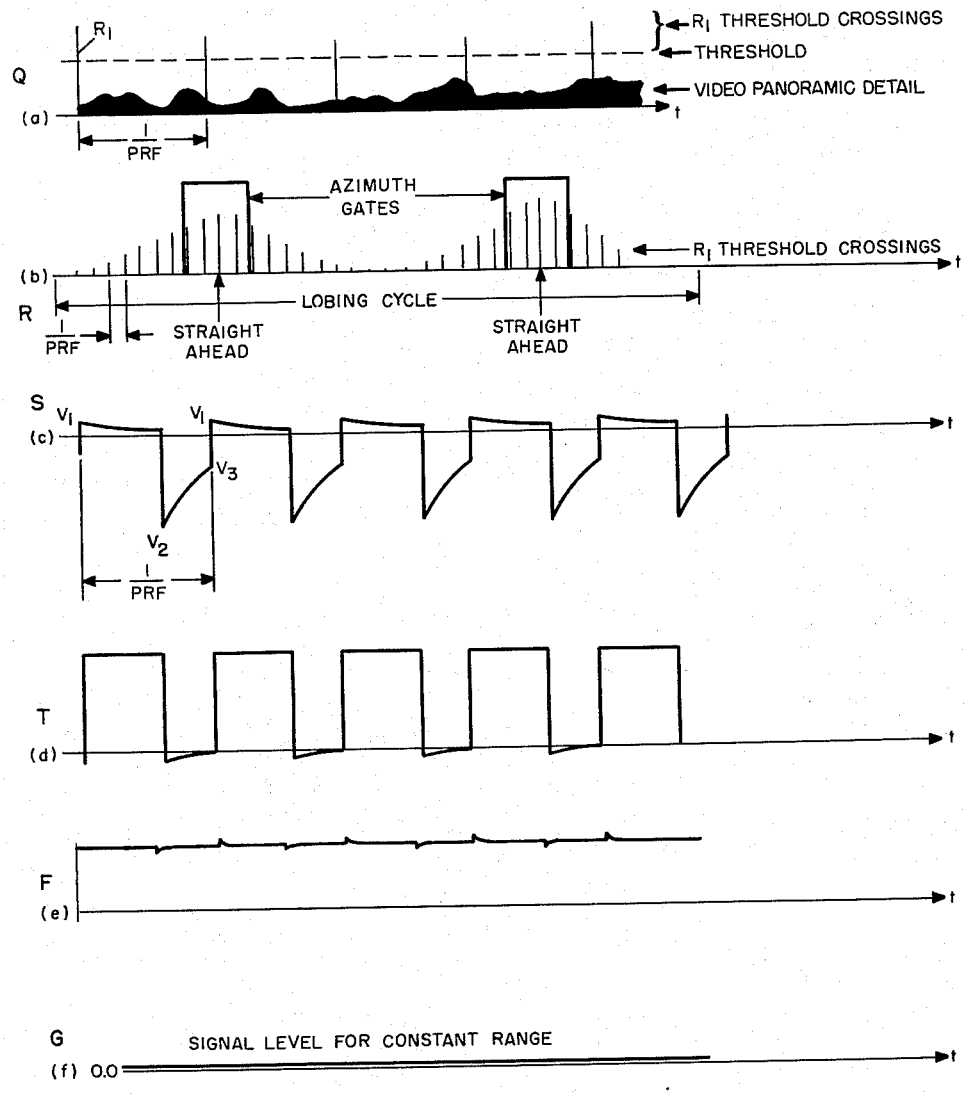

FIGURES 9 (a through f) are waveforms illustrating the operation of the range and panoramic display channels of the present invention.

Figure 10:
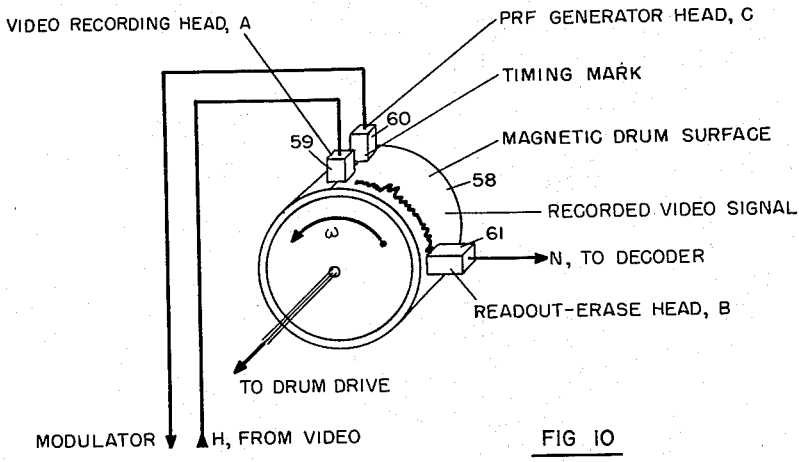

FIGURE 10 illustrates a magnetic drum unit which may be incorporated in the circuit of FIGURE 4.

Figure 11:
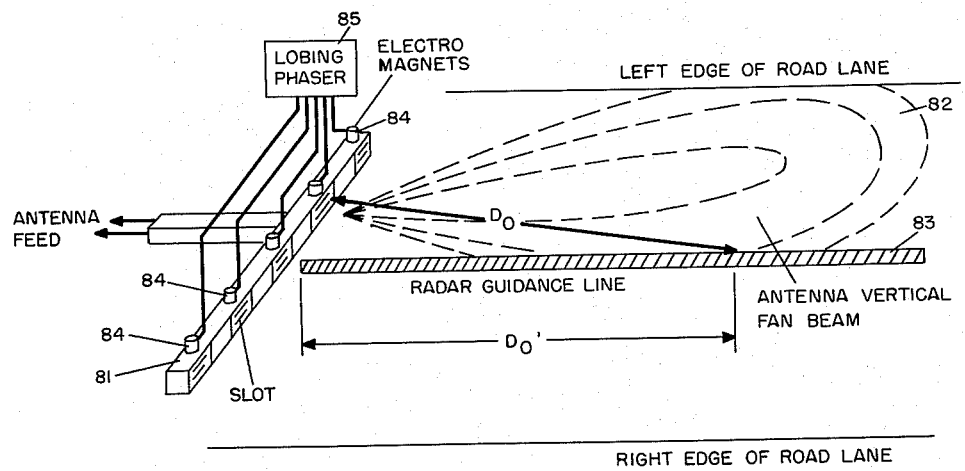

FIGURE 11 is an illustrative view of an antenna system employed in conjunction with an FM-CW radar device such as may be utilized in the present invention.

Figure 12:
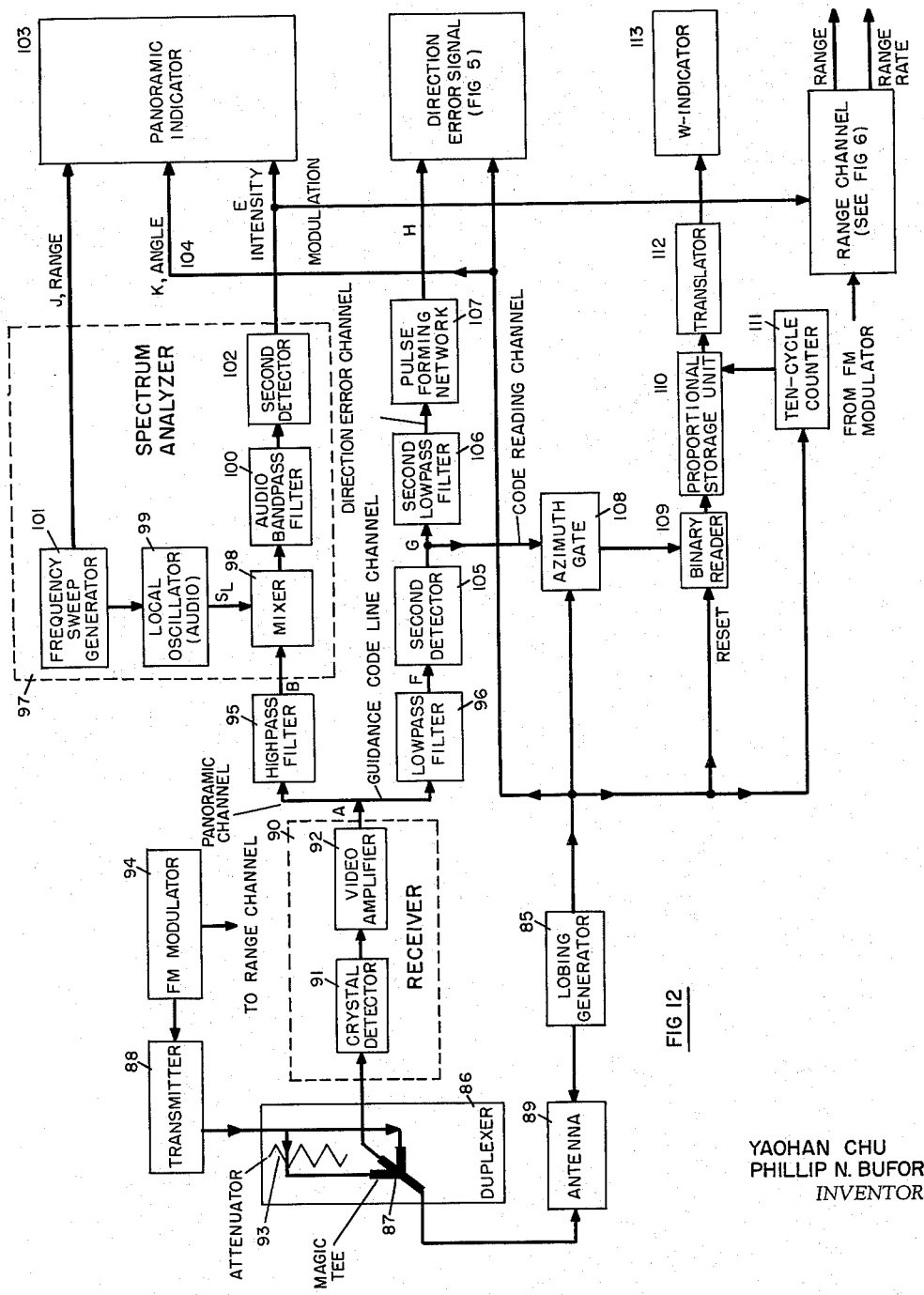

FIGURE 12 is a block diagram of an FM-CW radar system which may be utilized in conjunction with the arrangement of FIGURE 11.

FIGURES 13a and 13b show waveforms illustrating the operation of the circuit shown in FIGURE 12.

Figure 1:
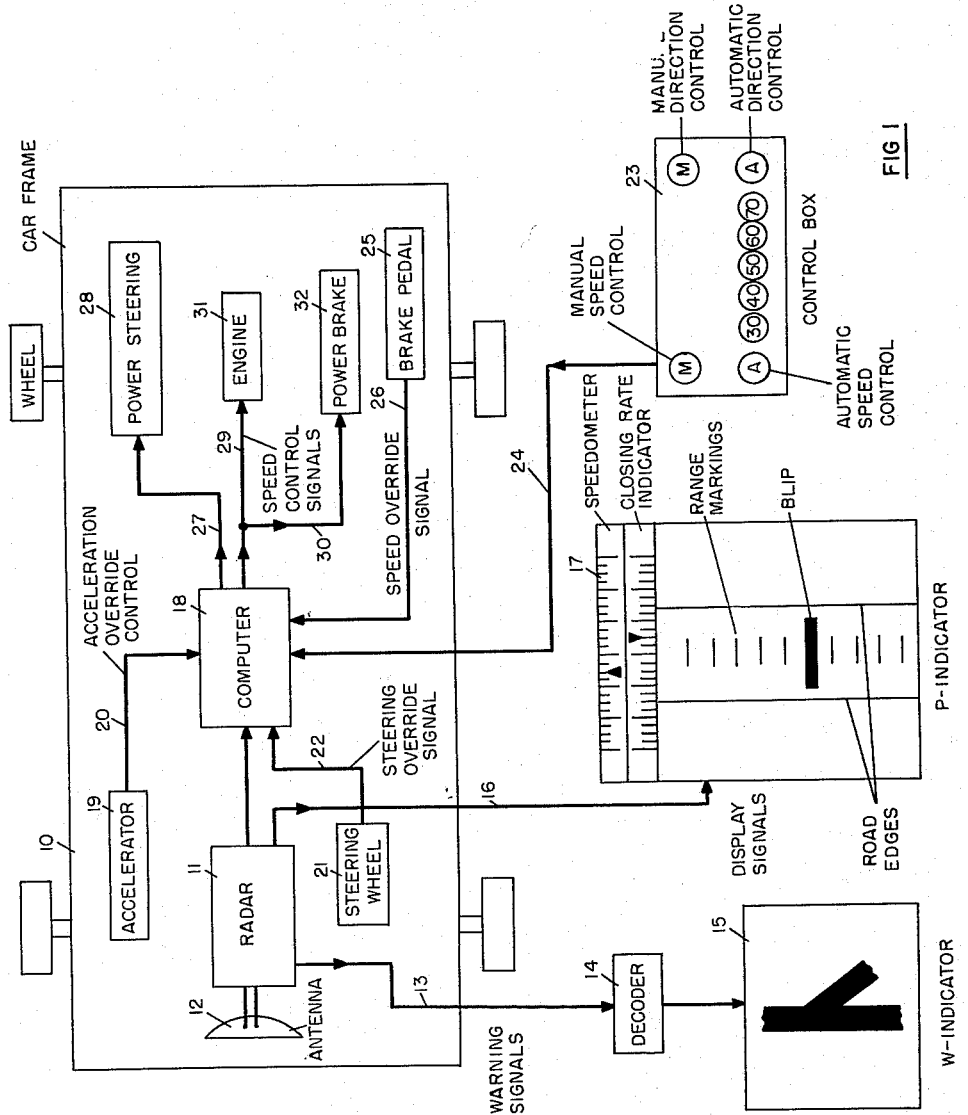
FIGURE 1 is a block diagram illustrating a vehicle arranged in accordance with the present invention, and further illustrating the various controls and indications afforded by the present invention.
Figure 14:
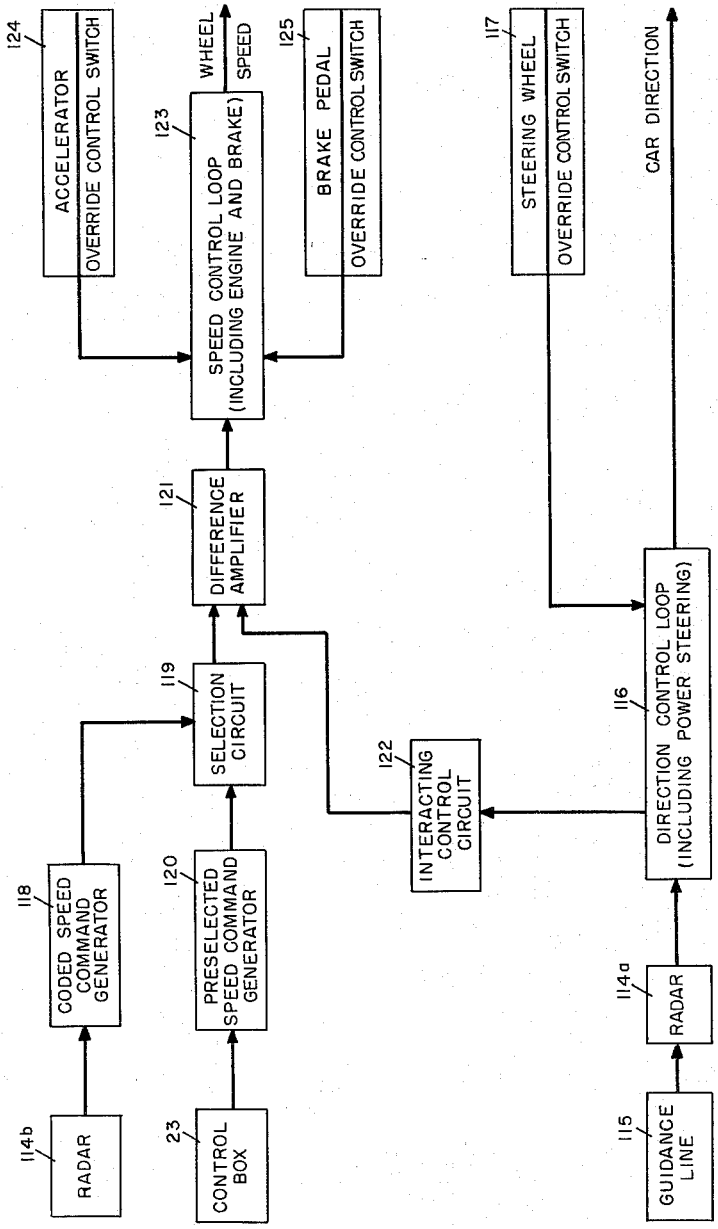

FIGURE 14 is a block diagram of a computer device, such as may be employed in the arrangement of FIGURE 1.

Figure 15:
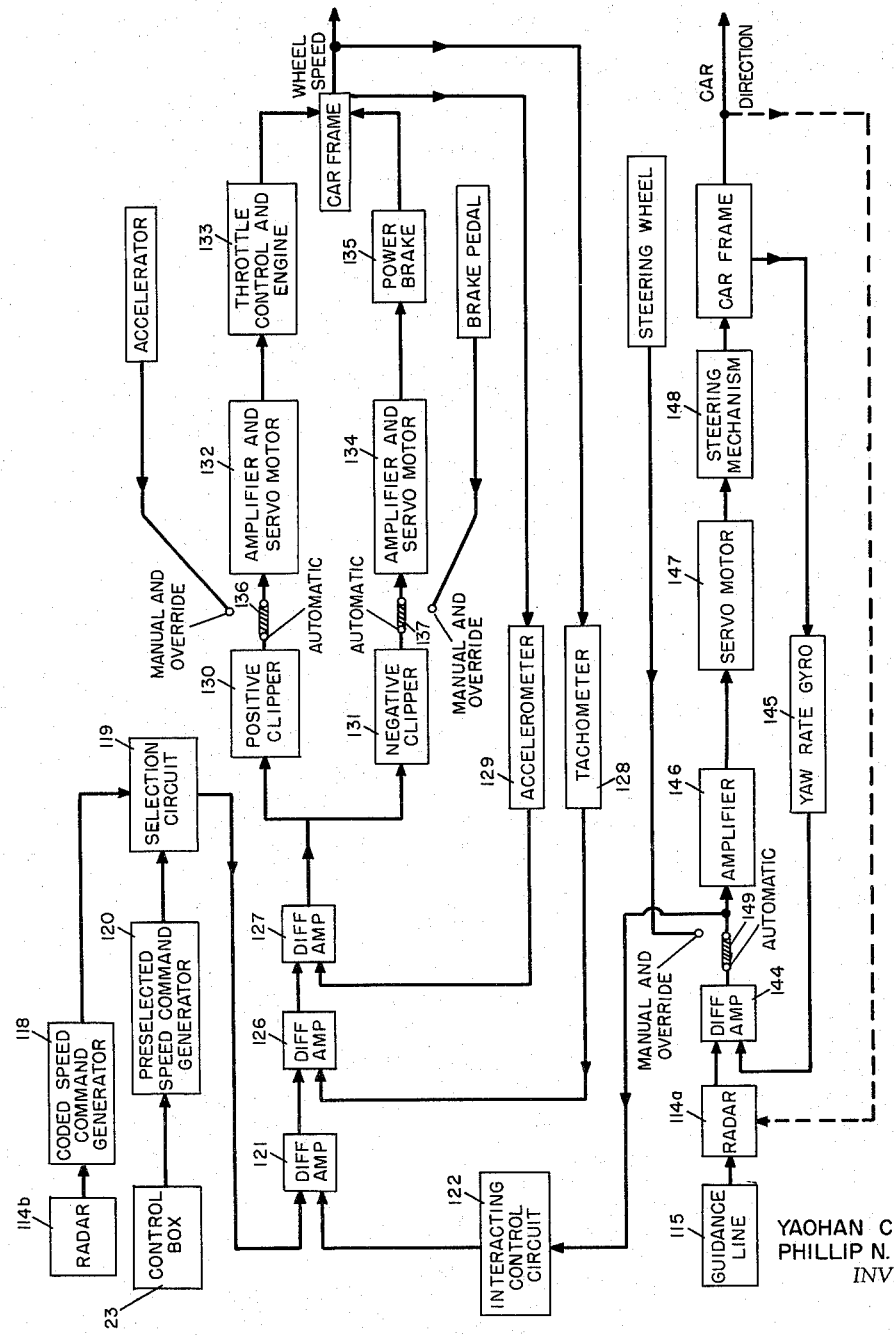

FIGURE 15 is a detail block diagram of the computer structure shown in FIGURE 14.

Figure 16:
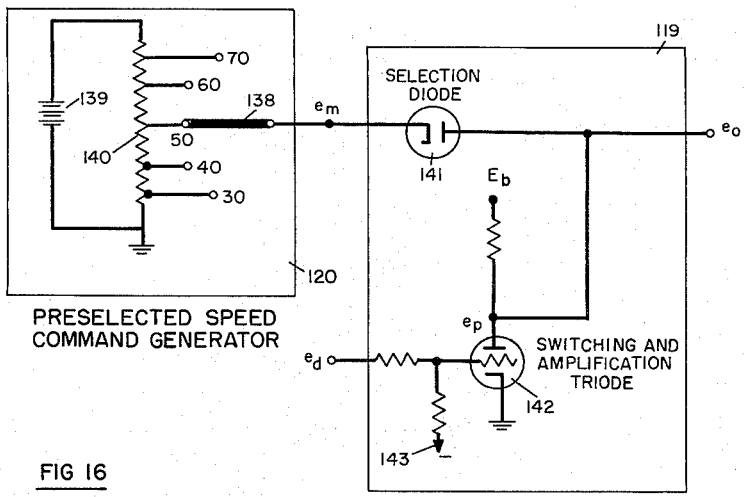

FIGURE 16 is a schematic diagram illustrating a portion of the computer device shown in FIGURE 15.

Figure 17:
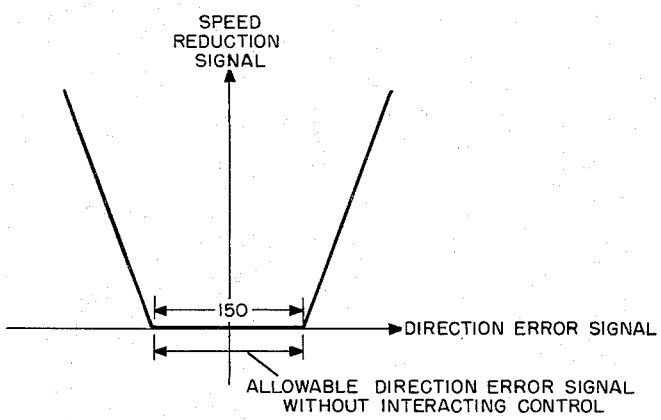

FIGURE 17 is a graphical representation of an interacting control circuit constructed in accordance with the present invention.

Figure 18:
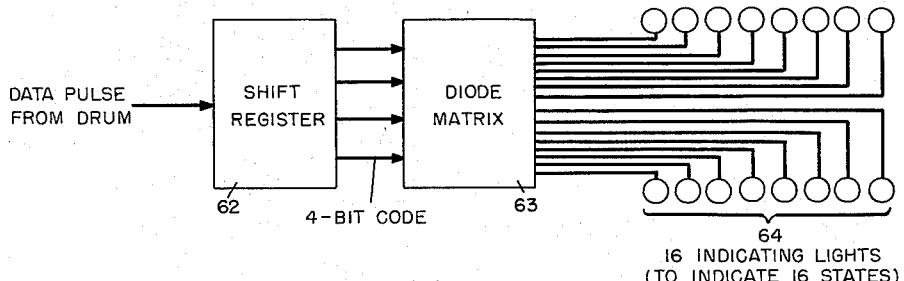
Figure 18:
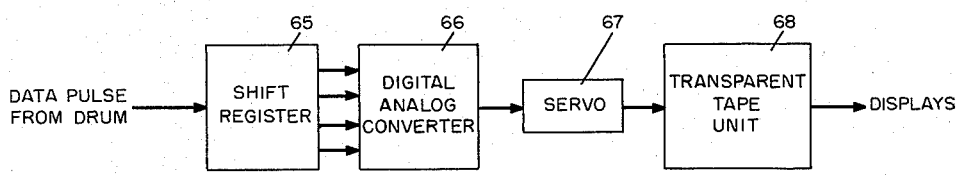
Figure 19:
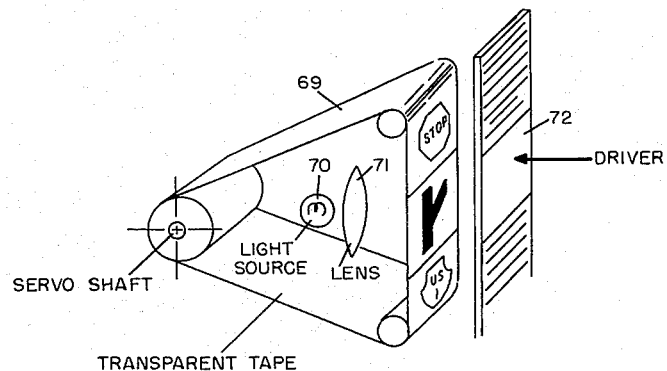

FIGURES 18 (a and b) comprise block diagrams of decoders and W indicator (warning indicator) devices constructed in accordance with the present invention; and FIGURE 19 is an illustrative representation of another form of warning indicator which may be employed in the present invention.

Referring now ot FIGURE 1, it will be seen that in accordance with the present invention an automatically controlled vehicle 10 may include a radar apparatus 11 coupled to a transmitting and receiving antenna 12. The output of the said radar antenna 12 is coupled via a line 13 and thence via a decoder 14 to a W (or warning) indicator 15 whereby warning signals, received by the radar, pass through the aforementioned decoder 14 to said indicator unit 15. The decoder 14 is operative to decode the coded signals from the radar and to display these coded signals on the W indicator 15. In particular, the W indicator is adapted to display actual road signs of intersection, entrance, exit, speed limit, bridge, railroad, and the like, as may appear along the highway; and the said indicator 15 may also include various indicating lights or the like to warn the vehicle operator of impending danger. If desired, automatic devices can be associated with the indicator 15 and with the channel feeding said indicator, to slow down or stop the vehicle 10 when a collision warning signal appears.

The radar 11 also feeds an output signal via a line 16 to a P (or panoramic) indicator 17, and the said P indicator can, for example, employ a B-scope type of display which shows range in a vertical direction and azimuth angle in a horizontal direction. Thus, the indicator unit 17 provides for a panoramic view of the road conditions ahead; and also gives the range of any automobiles which may appear ahead of the vehicle 10, the latter signals being identified by the blip indication of the vehicle ahead as well as by range markings on the indicator 17 itself. As indicated in FIGURE 1, the closing rate indication as well as speed indication of the vehicle may also be displayed at the top of the indicator 17, and to this effect, a closing rate indicator may be provided, e.g. of the type described in the text Electronic Time Measurements, by Chance et al., Radiation Laboratory Series V20, McGraw-Hill Book Co.

Radar unit 11 also couples signals to a computer 18. Computer receives a number of other signals as well. In particular, a manual accelerator 19 is provided, to furnish acceleration override control signals to computer 18 via a line 20; a steering wheel 21 is provided whereby a steering override signal can be coupled to said computer 18 via a line 22; a control box 23 is provided for producing manual and automatic speed and direction control signals, via a line 24, to the said computer; and a manual brake pedal 25 is provided for coupling speed override signals via a line 26 to computer 18. All of these various inputs are interpreted by the computer 18 in a manner to be described hereinafter to effect automatic speed and direction control of the vehicle. In particular, the computer is adapted to provide a direction control output via line 27 to power steering apparatus 28; and is adapted to provide speed control signals via lines 29 and 30 to the engine 31 and a power braking apparatus 32 of the vehicle.

The overall arrangement of FIGURE 1 is further characterized by the provision of a speed measuring device which measures the wheel speed or propelling shaft speed of the vehicle 10, and which sends a signal corresponding to said speed to computer 18, whereafter computer 18 may in turn send proper speed control signals to the engine 31 and/or to the brake 32, thereby to control the vehicle in accordance with the speed preselected on control box 23. The control box 23 actually utilizes feedback control principles to assure that a preselected fixed speed, determined by depression of a proper push button for example, is maintained; and a manual speed control button is also provided in the control box 23 in the event that no speed control is desired. The speed control signals produced by the arrangement of FIGURE 1 may also be sent to an automatic transmission device, if provided (not shown in FIGURE 1), for controlling the speed of the vehicle.

The mobile radar unit 11 may take the form of a pulse radar system or of an FM–CW radar, as will be described subsequently; and this unit 11, in conjunction with antenna 12, is the essential sensing device for the overall arrangement. The radar unit 11 provides direction signals whereby the vehicle is adapted to follow the road or a guidance line on the road; provides a range signal indicating the range of a vehicle ahead; provides a closing rate signal of a vehicle ahead; provides a collision warning signal of a vehicle ahead; and provides such other special warning signals as may be desired. Certain preferred structures comprising radar unit 11 will be discussed hereinafter in conjunction with FIGURES 3 through 13 inclusive; but it is important to note that the direction control features effected by the radar unit 11 comprise a most important and essential feature of the overall system, inasmuch as direction control is effected, as will be described hereinafter, in a manner which is far more satisfactory, more accurate, and safer than has been possible heretofore.

The computer unit 18 will be described in greater detail subsequently in conjunction with FIGURES 14 and 15. By way of introduction, however, it should be noted that said computer 18 may be either analog or digital in nature, and may indeed be a combination of the two types. The said computer is adapted to process signals received from the radar unit 11 as well as from units 19, 21, 23 and 25, and is adapted to issue control signals to the steering system, engine, and brake of the vehicle as well as other signals adapted to perform the speed and direction control of the vehicle. The computer may also generate certain further signals for the system, such as timing and sweep signals for the two indicators 15 and 17 already described.

Computer 18 is subject, as will be described, to the driver's override control in respect to both speed and direction. By way of example, as soon as the driver steps on the brake pedal 25, the vehicle speed control is automatically turned over to the driver. Moreover, the system is so arranged that as soon as the driver holds the rim of the steering wheel 21 under a certain predetermined minimum pressure, a device on the steering wheel actuates the computer to turn the control over to the driver. These examples emphasize the safety features of the overall control system.

Another important feature of the system, as will be described in more detail subsequently, resides in the interacting control between the speed control and direction control portions of the overall arrangement. For example, when the vehicle travels on a highway the surface of which is badly deteriorated, the vehicle speed may be too high for smooth steering. Under such conditions, the vehicle speed control is taken over by the direction control loop, owing to the erratic movement of the vehicle, and the vehicle speed is reduced. As another example, if the vehicle should travel at a preselected speed which is too high for a sudden turning along a curve, the direction control loop will again take over the speed control and reduce the speed to a proper level. In general, any driving condition which causes an unusually large direction error signal will cause the speed control of the vehicle to be temporarily assumed by the direction control loop; and the circuitry to accomplish such interacting control can, if desired, be incorporated into the computer 18.

The control box 23 provides, as illustrated in FIGURE 1, a plurality of push buttons, knobs, or other switching devices, whereby the driver of the automobile may select manual or automatic direction control, and manual or automatic speed control. Additional push buttons are provided for the selection of speed; and this is particularly desirable if there is a speed limit on the road being driven. Indicating lights can, of course, be provided to show that the system is on, that the radar is functioning, that the computer is operative, etc.

The automatic control system of the present invention is adapted to cooperate with a highway (see FIGURES 2a through h) which is marked, or which contains areas of different energy reflectivity, to permit a determination of certain necessary road information required by the control portions of the invention. As will become apparent from the subsequent description, the radar apparatus responds to such markings to produce the various signals to be described. By relatively simple modification of the radar means employed, said radar may in fact derive signals from a portion of the road itself, e.g. the edge of the road, whereby the difference in radiation reflectivity existing between the road edge and adjacent terrain causes said road edge to act as a radiation reflective road surface.

When auxiliary reflective road markings are to be employed, these may include a radar direction guidance line adapted to provide steering information, as well as a coded marker system adapted to supply warning and advisory signals of various road conditions, e.g. intersections, speed limits, etc. The guidance line itself may consist of a line of radar reflective material such as a tape of aluminum foil placed on the surface of the highway. The purpose of the guidance line (see for example lines 33 in FIGURES 2f, g and h), is to reflect signals originated by the sensory radar unit 11 so that the radar antenna 12 can detect the return signals and thus provide a direction control signal for the overall system. The guidance line is formed as a continuous or discrete reflective strip, a continuous or discrete reflective coating, or a discrete series of embedded reflectors such as corner reflectors slightly recessed in or protruded from the highway surface so as not to impede the traffic conditions of the highway.

As mentioned previously, the edge or edges of the pavement of the highway can be used as a guidance line, with or without auxiliary reflective material, provided the system is adapted to respond to such edge detection. Moreover, as mentioned previously, it is the difference in reflectivity which is of prime importance. Such difference in reflectivity could be accomplished not only by a positively reflective material, but also by a negatively reflective (absorptive) material; and the system would operate equally well by detecting the differences in reflectivity between the roadway surfaces and the absorptive road markings. Accordingly, terms such as "guidance line," "radiation reflective surfaces," etc. utilized hereinafter, are meant to include such roadway edge surfaces, as well as auxiliary roadway markings of both positive and negative reflective characteristics.

The guidance line, such as 33, may be arranged parallel to the length of the highway to form a tracking line along the center of each highway lane; or in the alternative, the said guideance line may be disposed along the sides of the highway such as at 34, 35 and 36 in FIGURES 2a through d. Indeed, as illustrated in FIGURES 2b and 2d in particular, the guidance lines can comprise two such lines disposed along the opposite sides of the highway, thereby giving high safety and reliability. The reflective surface can, as will be described subsequently, be made or installed so as to reflect only in a single direction opposite to the travelling direction of the vehicle; and this particular characteristic of the guidance lines assures that vehicles travelling in the opposite direction are not interfered with.

As was mentioned above, various codes are provided along the roadway to provide signals for various control and warning purposes. Certain forms of this coding will be described subsequently, but it should be noted in passing that the coding can be achieved by modifying the guidance line; by placement of special code reflectors along the road; or by a combination of both. Coding of a guidance line comprising a discrete series of reflecting strips, may be attained by using variations in reflective strip lengths, strip spacing, or strip shapes; and coding of a continuous guidance line can be achieved by breaking it first into a discrete line and then by using similar variations of similar line strips. Coding can also be achieved by using an auxiliary code line or lines, or a code pattern placed on and along the highway, or by using marker beacons placed on or at the vicinity of highway objects such as bridges, viaducts, or stop signs; and the coding can indeed be achieved if desired by employing different polarization characteristics of the reflectors or reflective material utilized on the road.

Figure 2:
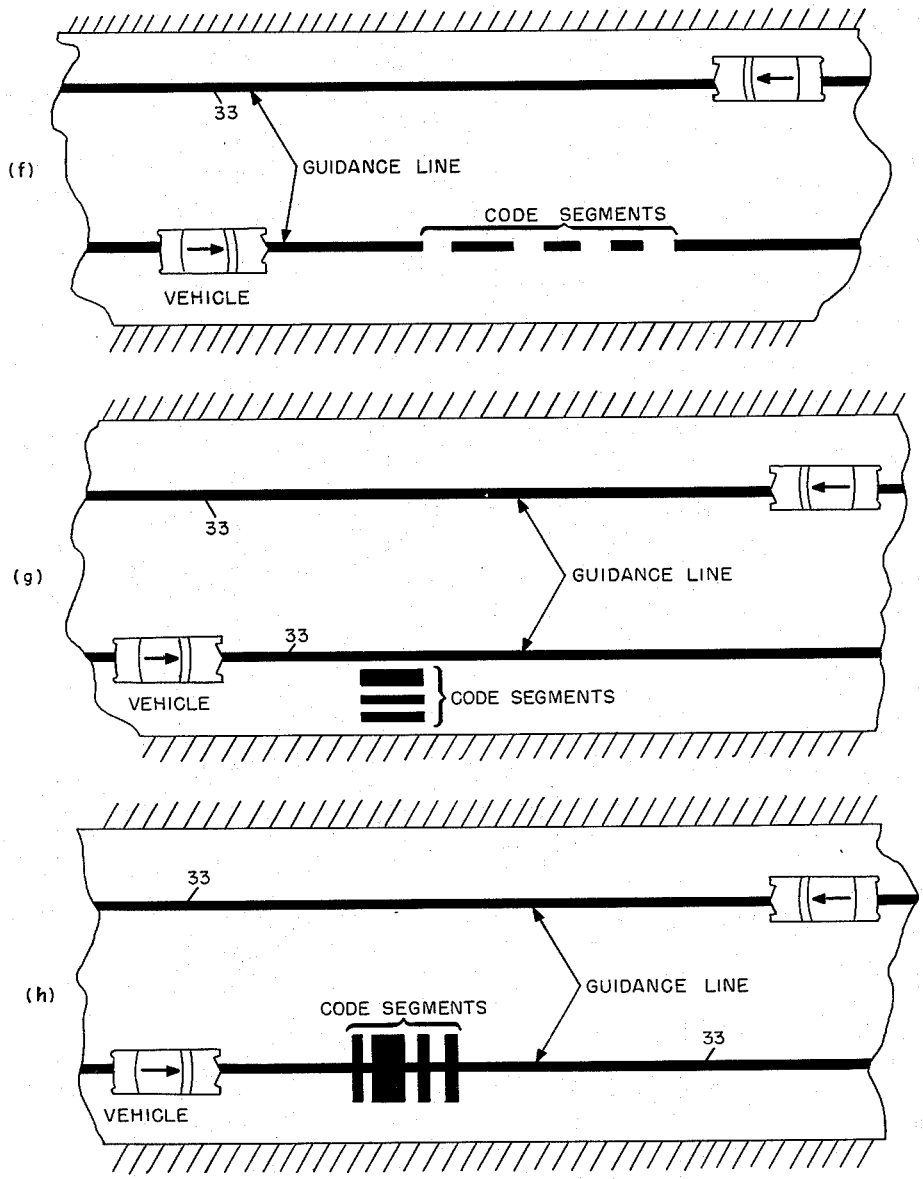
FIGURES 2 (a through h) illustrate various roadway arrangements cooperating with the improved vehicle of the present invention for providing the control, warning and indication signals afforded by the present invention.

The foregoing general principles will become most readily apparent from an examination of FIGURE 2. In particular, the arrangement of FIGURE 2a is such that the road bed includes a reflective concrete strip 37 as a guidance line. Such conductive concrete may be formed by impregnating concrete with metallic oxides, low grade metal ores, or special chemicals; and the conductive concrete strip 37 may be disposed either at flush level with the road bed, or disposed as a raised curb along the edge or the center of the road. In the alternative, of course, the said strip 37 may, if desired, be used as a recessed surface layer on the highway. Two such arrangements are illustrated in FIGURE 2a, in one of which the strip 37 is disposed along the center of a lane for right-to-left moving traffic, while in the other traffic lane a reflective curb 34 having, in the particular example shown, coding marks 38, is disposed as a curb guidance line for traffic moving from left to right.

The aforementioned conductive concrete may indeed be employed over the entire roadway surface, and the edge of the roadway, or any other desired position of the guidance line, may be corrugated as illustrated in FIGURES 2b and 2c to provide the reflective structure. Such a corrugated surface has been found to be much more reflective of RF energy than are uncorrugated surfaces, whereby the necessary control, warning and guidance signals can be received.

In addition, as illustrated in FIGURE 2e, the corrugated concrete may be covered if desired with a layer of metal foil 39 thereby to enhance the back scattering properties of the guidance line. Other arrangements for guidance lines will be readily apparent to those skilled in the art, from the preceding discussion.

The coding employed on the roadway may also take various configurations, and certain such codes have been illustrated in the several FIGURES 2a through 2h inclusive. As illustrated in FIGURE 2a, the coding 38 may take the form of a plurality of breaks in the reflective concrete. FIGURES 2b and 2d illustrate the coding in the form of breaks in the corrugated and/or ribbon covered corrugated strip. FIGURE 2f illustrates the code signals as taking the form of a plurality of breaks in a center disposed guidance line. FIGURE 2g shows code signals disposed to one side of the guidance line in a direction generally parallel to the guidance line; while FIGURE 2h shows further code signals comprising reflective strips disposed transverse to the guidance line. The various codes illustrated in the several figures represent the binary code 10010101, and this particular code would be interpreted by the overall system, in the manner to be described subsequently, to effect a control or to give a warning indication characteristic of that particular code. Other dispositions of the coding strip, corresponding to other code arrangements, will of course be employed to produce other control and indicating functions.

As has been discussed previously, the basic sensory element of the present invention comprises a radar unit 11 adapted to cooperate with a suitably marked road containing guidance lines and code markings, to produce automatic control and indication signals of the general types already discussed. In order that the operation of preferred forms of such sensory units may be appreciated, reference is now made to FIGURES 3 through 10 which illustrate a pulse type radar system, such as may be employed in the practice of the present invention.

Referring in particular to FIGURE 3, it will be noted that the pulse radar system illustrated therein utilizes a dual beam antenna 12 adapted to produce a first beam A cooperating with the road guidance line and code markings thereby to give control information as well as various warning signals; and said antenna 12 also produces a second beam B comprising a ranging beam which senses the range and range rate of obstacles. The dual beam antenna 12 is coupled via uniplexers 40 to an azimuth lobing generator 41 as well as to a transmitting channel comprising transmitter 42, modulator 43, and a PRF generator 44; and the arrangement of structure thus far provided is therefore adapted to generate the two beams A and B.

Also coupled to uniplexers 40 are two detection channels adapted to respond respectively to signals received by beams A and B. In particular, the channel adapted to respond to information from the guidance beam A comprises a detector 45 feeding a direction error signal channel 46, and also feeding a guidance code reading channel 47, these two channels 46 and 47 being operative respectively to produce direction error signals and coded output signals. Similarly, the ranging beam B feeds signals to a further detector 48, which in turn feeds a panoramic display channel 49 and a range channel 50, adapted to produce respectively panoramic display signals as well as range and range-rate signals.

The actual structure of the various channels thus described in reference to FIGURE 3 will become more readily apparent by an examination of the detail diagrams comprising FIGURES 4 through 6. The transmitter 42, driven by modulator 43, simultaneously transmits pulses to four uniplexers designated respectively $A_L$, $A_R$, $B_L$ and $B_R$, these having been lumped together as uniplexers 40 in FIGURE 3. From each separate uniplexer the pulses go to separate antenna feed horns associated respectively with the several uniplexers. In this latter respect reference is made to FIGURE 5a which shows the coupling of the beam A channel to the antenna; FIGURE 5b shows a plan view illustrating the coupling of the beam B channel to the antenna; FIGURE 6a shows a side view of the uniplexer coupling to the dual beam antenna; FIGURE 6b shows a front view of the antenna with the different antenna feed horns; and FIGURE 6c illustrates a rear view of the antenna, also showing the coupling of the several uniplexers to the antenna 12.

On reception of energy from objects located in the central gain pattern of beam A, said beam A will return high energy to the feed horn of the channel A, but a much lesser energy level to the feed horn of channel B. The reverse is true for objects located in the beam pattern of channel B. Accordingly, since the several beams are so directed that guidance and code line information is illuminated by beam A, channel A senses only such guidance and code information; whereby beam A may be termed the guidance beam. Similarly, beam B illuminates only objects above the highway surface, whereby channel B is primarily operative to sense panoramic (range and azimuth) detail; and beam B may therefore be referred to as the range beam.

The feed horns of the dual beam antenna 12 are split horns consisting of sections corresponding to $A_L$ and $A_R$ for the A beam; as well as further sections corresponding to $B_L$ and $B_R$ for the B beam (see in particular FIGURE 6b). In both channels A and B, each horn section has a separate subchannel leading into the uniplexer (see FIGURE 6c). The uniplexer $A_R$ is driven by a voltage from lobing generator 41. Through the characteristic property of the uniplexer, the lobing generator voltage produced by element 41 causes a proportional amount of attenuation in subchannel $A_R$, and thus permit a proportional fraction of the energy of beam A to be transmitted to the channel A detector 45. Similarly, the uniplexer $A_L$ is fed with a voltage from the aforementioned lobing generator 41, but the voltages so fed to the uniplexers $A_L$ and $A_R$ from generator 41 are oppositely phased. As a result, when the generator 41 voltages are varied, this has the effect of shifting the sensitivity from beam A to beam B in a direction dependent on the voltage variations of the lobing generator.

The signal presented to the channel A detector 45 is the sum of the separately attenuated signals in the subchannels $A_L$ and $A_R$ associated with the A or guidance beam; and, inasmuch at this signal sum is proportional to the sum of the separately attenuated beam signals, it has the same angular dependence. The effect of this overall arrangement is therefore to create an effective antenna beam which is voltage scannable in the azimuth plane, as indicated for example in FIGURE 5a by the two scan positions of the beam, $A_R$ and $A_L$.

As will be noted from an examination of FIGURE 3, the improved radar apparatus of the present invention includes, in the receiving portions thereof, three distinct channels designated respectively as the "Direction Error Signal Channel" 46, the "Guidance Code Reading Channel" 47, and the "Panoramic Display Channel" 49; and may include as a portion thereof, or as a separate channel, the range channel 50. These several channels and their operation will be examined individually; and reference is particularly made to FIGURE 4 which contains block diagrams of these several channels in somewhat greater detail.

Referring first to the direction error signal channel 46, it should be noted that when beam A scans, due to variation in the output voltage of lobing generator 41, the effective beam sweeps back and forth across the direction guidance line (see FIGURE 5a). If the edge of the road were to be employed for guidance purposes, the beam would be caused to sweep across such edge. Each passage across the guidance line produces a sharp rise in the level of reflected microwave energy, and the lobing pulse produced is in fact shown by the signal waveform in FIGURE 7b, signal H. When the antenna boresight axis scans symmetrically with respect to the guidance line, the lobing pulses (such as pulses a, b and c in FIGURE 7b) occur at regular intervals. However, if the vehicle 10 does not follow the guidance line, whereby the antenna boresight axis scans asymmetrically with respect to the guidance line, the lobing pulses become unevenly spaced in time, as illustrated by pulses c, d and e in FIGURE 7b.

The received signals are, as mentioned previously, coupled to a video detector 45, and the said signals are thereafter coupled to a filter 51 in the channel 46 (see FIGURE 4). Filter 51 is operative to remove the pulse repetition frequency, thereby producing an output taking the form shown in FIGURE 7c; and this filtered waveform is thereafter coupled to a pulse shaping network 52, operative to produce guidance line pulses of the type illustrated in FIGURE 7d.

As will be noted from an examination of FIGURE 4, the standard shape pulses produced at the output of pulse shaping network 52 are coupled to a bistable multivibrator MV-1, thereby to trigger said multivibrator alternately to each stable state. The output signals $K_1$ and $K_2$ of the said multivibrator MV-1 are illustrated in FIGURE 7e. The time interval which the said multivibrator spends in each of its two stable states is proportional to the interval between successive standard pulses. For example, when the beam sweeps in a right-to-left direction, a pulse is generated which triggers the multivibrator to a first stable state. When the next lobing pulse is generated by a left-to-right beam sweep, the multivibrator is triggered to its opposite stable state. Similarly, a third pulse will re-trigger the multivibrator back to its first stable state when it occurs. There is, of course, a possibility of circuit malfunction wherein a first such pulse, e.g. $P_1$ (see FIGURE 7d), will find the multivibrator in an undesired one of its stable states. To prevent this possibility, a voltage $A_L$ and $B_L$ is fed from the azimuth lobing generator 41 via a line 53 to MV-1; and this voltage serves to automatically reset MV-1 to its proper stable state at the termination of each right-to-left beam sweep.

The signals $K_1$ and $K_2$ (FIGURES 4 and 7e), correspond respectively to the multivibrator plate and grid voltages. The positive voltage level of signal $K_1$ is an instantaneous measure of the time spent in state one, and thus of the time between the pulses such as $P_1$ and $P_2$ (FIGURE 7d). Similarly, the positive voltage level of signal $K_2$ is a measure of the time between the pulses $P_2$ and $P_1$. The positive grid and plate signals thus produced by multivibrator MV-1 are transmitted to two separate integrators 54 and 55 which produce signals $L_1$ and $L_2$ (see FIGURE 7f), respectively proportional to the total time which the multivibrator spends in its two opposite states; and the outputs of the said integrators 54 and 55 are thereafter coupled to a difference amplifier 56 to produce an output signal M (see FIGURE 7g) which is proportional to the direction error and has the proper sign of the error. This signal is transmitted to the direction control servo-amplifier in the computer 18, whereby the said computer may produce proper signals operative to control the steering mechanism of the vehicle to reduce the error to zero.

The code reading channel 47, illustrated in FIGURE 3, actually comprises a number of distinct units (see FIGURE 4) including a PRF generator and code storage unit 57 and a decoder unit 14 serving to feed signals to the W indicator 15, already mentioned in reference to FIGURE 1. The operation of the code reading channel will become most readily apparent from an examination of the waveforms shown in FIGURE 8 in conjunction with the block diagram of FIGURE 4. The time scale of FIGURE 8 is expanded with respect to the time scale of FIGURES 7a through 7g, already discussed, and this will become apparent for example by a comparison of FIGURES 7a and 8a, each of which is intended to show the time scale adopted for the two figures.

As beam A scans, it may in the course of its scanning encounter coded markings such as those illustrated in FIGURE 2, and the waveform shown in FIGURE 8b is intended to illustrate a code return signal which might be obtained during one beam scanning across the guidance line. It should be noted that the radar pulse duration is short, for example 0.01 microsecond, to permit range resolution of the individual code strips. Because the pulse repetition frequency is high, a large number of repeated readings of any code are obtained during any single beam scan cycle, as illustrated by the aforementioned waveform FIGURE 8b. It should further be noted that because of the relatively slow movement of the vehicle 10 along the guidance line, many beam scannings of any code are made before the vehicle moves past the code strips.

The code return signal is coupled via video detector 45, thereby to produce a video signal H (FIGURE 8c) corresponding to the microwave signal (FIGURE 8d); and the coded video signal H is thereafter transferred to the PRF generator and code storage unit 57. It is of course desirable to take advantage of the redundancy in code readings in order to minimize errors in the process of detecting and reading a code from the guidance line; and this advantage may be taken by appropriate design of an integrating code storage unit. Such an integrating storage requires synchronization of PRF generation and storage operation, whereby the PRF generation, code storage and code read-out logically form an integral unit of type designated 57 in FIGURE 4.

The above functions may be effected by a magnetic wire or tape, magnetic drum, magnetic core, acoustic delay line, magnetostrictive delay line, ferroelectric, or electrostatic storage unit, and may include electronic switching circuits. As an example, one possible structure for the PRF generator and code storage unit 57 is illustrated in FIGURE 10 and comprises, in this form of the invention, a magnetic drum 58 having a video recording head 59 fed from the output of video detector 45, a PRF generator head 60 feeding the modulator 43, and a read-out erase head 61 feeding the decoder 14.

Examining the particular operation of the structure thus shown in FIGURE 10 and diagrammatically illustrated in FIGURE 4, it should be noted that the drum 58 has on its surface a permanently recorded signal providing a pulse timing mark. This recorded signal passes beneath and induces a pulse in the PRF generator head 60 for each revolution of the drum; and the induced pulse triggers the modulator 43 which pulses transmitter 42. Reflections from the transmitted pulse subsequently arrive at the video recording head 59 as the signal H (FIGURE 8c). Inasmuch as the drum is continuously rotating, this video signal, corresponding to the received code, is stored in sequence as the recording on the periphery of drum 58. When the drum has executed one revolution, the pulse timing mark again passes under the PRF generator head 60 and causes transmission of another radar pulse. Now, since the drum has the same rotational position at the time of this and each succeeding transmitted pulse, the several coded video returns H, received during this second and succeeding pulses, will be recorded after the same time interval at the same peripheral position as the previous code returns, providing the reflecting code strip group remains at nearly the same range.

As will be appreciated from the foregoing description, the recording on drum 58 of the received code signals is of a proportional type; and the gain of the recording channel is preferably so chosen that it is insufficient to cause magnetic saturation of the drum surface in response to reception of a single code signal. Each code signal is recorded at a level proportional to the received video level, and this characteristic permits successive recordings, superposed as described above, to be additive, thereby resulting in an integration of the synchronized multiple code readings. This integrated proportional recording reduces interferences of all types, and the redundancy of code readings is handled beneficially to reduce errors in the final code reading. It will be appreciated that the video read-out erase head 61 is positioned so that it can read out the integrated recordings to produce a code signal which is coupled to decoder 14, in the manner to be described subsequently.

The operation of the magnetic drum unit shown in FIGURE 10, preferably comprises a three-step cycle, the steps being respectively recording and integration, read-out, and erase. The cycling period can be preset as desired, the length of the first step being determined by the desired integration time. At the end of the integration period, the read-out step takes place and requires only the time to read the drum once; and directly following each read-out, the read-out head 61 can be given an erase signal. This third step therefore closes the drum storage and read-out cycle and permits new recordings to be made. A convenient cycling signal can in fact be made available from the drum 58 itself or from the lobing generator 41.

The read-out head 61, as mentioned previously, continuously reads the stored signals (shown in FIGURE 8d) and reproduces the code in a pulse form. This train of coded signals is then transmitted to the aforementioned decoder 14 which decodes the coded signals and sends a switching voltage to the appropriate circuit lead which in turn actuates the control amplifier. The output of the decoder 14 may comprise the W indicator 15 or may comprise any other unit adapted to respond to the coded reception. In particular, the code employed in conjunction with the guidance strip is preferably of the binary type, although it may take the form of a decimal code, reflective code, Murray code, Morse code, or the like. For purposes of the present description, it has been assumed that a binary coded signal is employed, and indeed a four-bit binary code would give 16 possible signals at the output of the decoder 14.

Two embodiments of the decoder 14 and W indicator 15 are illustrated in FIGURES 18a and 18b; and FIGURE 19 illustrates a form of W indicator which might be employed. In the embodiment shown in FIGURE 18a, the serial pulse data taken from the drum 58 is first sent to a shift register 62 which translates the serial data into parallel form, whereafter this parallel information can be coupled to a diode matrix 63 to actuate an appropriate output control line. In the event that a four-bit binary code is employed, the output of the matrix 63 could energize a selected one of sixteen possible lines, and these could in turn actuate an appropriate one of sixteen individual indicating lights 64 which could in turn be individually representative of intersections, clover-leaves, exits, merging lanes, bridges, viaducts, stop signs, speed limits, and the like. These lights 64 therefore can be considered as one form which the W indicator 15 might take.

In accordance with another embodiment of the W indicator, shown in FIGURE 18b, the serial pulse data from drum 58 can again be converted into parallel form by a shift register 65, the output of which feeds a digital-to-analog converter 66. The voltage output of converter 66 is thereafter employed to command a servo 67 which positions the servo-shaft to a pre-designated orientation. The servo-shaft can in turn be employed to drive a transparent tape unit 68, of the type illustrated for example in FIGURE 19; and the positioned servo-shaft could in fact position a corresponding picture sign on a transparent tape 69 whereby light source 70 and lens means 71 cooperate with tape 69 to project an appropriate display onto a screen 72. Systems operating in this manner are sometimes termed "rotation converters," and are described in the text High Speed Computing Devices, by the staff of Engineering Research Associates Inc., McGraw-Hill Book Co. The particular position of the display unit shown in FIGURE 19 produces a display of a merging lane; and this in fact corresponds to the display selected in FIGURE 1. It will be appreciated that the several picture signs, corresponding to portions of tape 69, could be made detachable so that new ones could be added or substituted as might be desired.

Each of the foregoing portions of the apparatus, illustrated in FIGURES 3 and 4, have cooperated with the A beam and have served in the manner described to produce direction error signals and code reading signals. The range and panoramic display channels 49—50, however (see FIGURES 3 and 4), are designed to cooperate with the B beam. As shown in FIGURE 5b, the B beam scans in a manner similar to that already described with respect to the guidance beam A, and this scanning operation is accomplished by an arrangement of feeds and uniplexers similar to those employed in the guidance beam A scanning and already described.

When the transmitted ranging beam B illuminates any highway object ahead of thet moving vehicle 10, a return signal is coupled via video detector 48 to the panoramic channel 49 and range channel 50. The video envelope for this return signal has been illustrated in FIGURE 9a. In the event that the object illuminated is another vehicle, its large radar cross-section will produce a return significantly higher than that returned by other objects in the panoramic scan pattern. The entire video signal (FIGURE 9a) is transmitted to the panoramic display unit or P indicator 17 (see FIGURE 1).

Other vehicles on the highway, of course, pose a collision problem; and to avoid collision, range and range rate of such other vehicles are measured by the radar and transmitted to the computer 18 to generate proper own-vehicle control signals as well as appropriate warning indications. The particular video return belonging to vehicles directly in the own-vehicle path must be recognized; and discrimination of other-vehicle returns from background video can be effected by signal level discrimination, inasmuch as vehicle returns exceed other panoramic detail. Moreover, discrimination of straight-ahead vehicle signals against side-vehicle signals can be effected by correlating the beam B position with the time of the vehicle signal return.

As illustrated in FIGURE 4, the video return signal, produced during scanning of beam B, is coupled to a thresholding circuit 75 in the range channel 50. FIGURE 9a illustrates both the video level and threshold level of possible returns, and a single return $R_1$ is shown repeatedly crossing the threshold produced by unit 75. The threshold is in fact set sufficiently high to assure that any signals, such as $R_1$, will be vehicle returns.

The $R_1$ threshold crossings are transmitted to an azimuth gate 76 which is opened by a signal fed from lobing generator 41 each time that the radar beam B is brought into a straight-ahead position. As illustrated in FIGURE 9b on a reduced time scale, the above threshold returns from a straight ahead target may therefore be received during one beam lobing cycle; and the azimuth gate is shown as positioned at the proper lobing cycle phase position to distriminate straight-ahead targets. Thus, as beam B scans across another vehicle, the signal $R_1$ appears several times in the azimuth gate, and consequently is transmitted to the range measuring circuitry (to be described), while returns at other than straight-ahead beam positions are gated out.

The range measuring circuit, as illustrated in FIGURE 4, comprises a monostable multivibrator MV–2 and an integrator 77. The multivibrator MV–2 receives a triggering pulse from the modulator 43 each time that a radar pulse is transmitted, and MV–2 changes from its stable state to its second state (see FIGURE 9c) each time it receives such a triggering pulse. The time scale of FIGURE 9c corresponds to the time scale previously chosen for FIGURE 9a; and it will be appreciated from FIGURE 9c that the grid voltage of the monostable multivibrator MV–2 steps to an unstable level $V_2$ upon transmission of a radar pulse, and thereafter begins a linear recovery toward a voltage $V_3$. Recovery continues until a return $R_1$ triggers MV–2, thereby to instantaneously return the grid voltage of MV–2 to its stable value $V_1$ (see FIGURE 9c).

The corresponding stable plate waveform for the unit MV–2 takes the form illustrated in FIGURE 9d. This particular waveform 9d consists of rectangular pulses of fixed amplitude and of lengths equal to the time interval between a transmitted pulse and its associated return pulse $R_1$; and the alternate triggering and recovery of the unit MV–2 is repetitive for each transmission and signal reception. The signal waveform shown in FIGURE 9d is transmitted from unit MV–2 to the integrator 77 which smooths the pulse form over a lobing cycle and thus over many transmission periods; and the result is a signal F (see FIGURE 9e) which is proportional in magnitude to the range from the transmitting vehicle to the other vehicle being detected.

This range signal which apears on line 78 may be coupled to the computer 18 to effect appropriate speed control signals, and may also be coupled to the indicator 17 to give an appropriate blip on the range marking scale thereof. The smooth signal produced at the output of integrator 77 may also be differentiated in differentiator 79 to produce a range rate signal on line 80; and this range rate signal may similarly be coupled to the units 17 and 18 to provide an appropriate indication and vehicle control signal.

Figure 13:
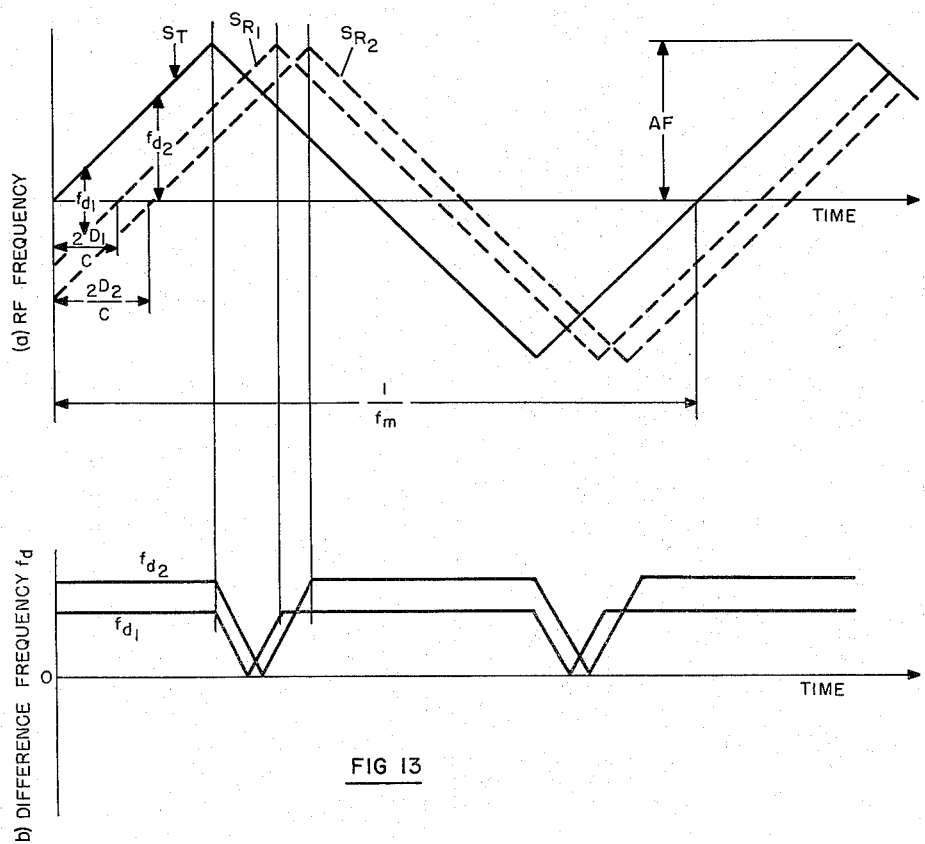

The description given above relates, of course, to a pulse type radar system such as may be employed in effecting vehicle control; but, as mentioned previously, other types of radar may be employed; and in particular, FM-CW radar can be employed. An example of such an FM-CW radar system for use in vehicle control is illustrated in FIGURES 11 through 13. The FM-CW system may, if desired, employ a double beam antenna arrangement of the types already described for producing a separation in the functions of panoramic scanning, and of guidance and code line scanning. However, a one-beam antenna system (which is equally usable for the pulse system already described, with appropriate circuit modification) will be described for use in the FM-CW system as an additional example of the form of transmitting equipment which can be employed. In addition, as will become apparent from the subsequent description, frequency filtering techniques can be employed for separation of guidance line panoramic information when such a one-beam antenna system is employed, in either the pulse radar or FM-CW radar systems.

Referring first to FIGURE 11, it will be noted that this particular figure illustrates the antenna system and its feed, for use in an FM-CW radar apparatus constructed in accordance with the present invention. The antenna proper may compirse a linear slot array 81 constructed for example as an integral portion of the radiator grill work on the vehicle 10. The array 81 is oriented horizontally so as to produce a vertical fan beam pattern 82, and the length of the array is sufficient to make the pattern narrow in its azimuth dimension thereby to give high azimuth angle resolution. Vertical resolution is considered to be less important. The beam 82 thus illuminates all objects lying on the road immediately in front of the vehicle, including the guidance lines, such as 83.

Scanning of the beam 82 is effected by changing the relative phases of the signals emanating from each slot in the array 81; and to accomplish this, each slot preferably contains a ferrite window. The ferrite has a property which causes a delay in the radio signal emanating from each window in the array, and this delay is continuously controllable by changing a magnetic field present in the ferrite. In FIGURE 11 there is shown a series of controllable electromagnets 84, the magnetic field of each of which is applied to the corresponding ferrite window. The fields of the several electromagnets 84 are controlled in synchronism by a suitable lobing phaser 85 so that at any instant the delay of the emitted radiation from all the slots has some uniform variation from slot to slot. The magnitude of the variation is caused to cycle through positive and negative values under the control of lobing phaser 85 whereby the envelope of the equiphase front (antenna beam pattern), is caused to rotate in azimuth. This action results in azimuth scanning of the fan beam 82.

The FM-CW radar requires, as does the pulse radar system, isolation of the receiver from the transmitter. In addition, it requires a mixing at RF of the transmitted and received signals in order to obtain range information. These functions can be accomplished by an arrangement similar to that shown in FIGURE 12. In particular, a duplexer 86 may be provided which includes a "magic Tee" microwave junction 87. The RF signal from transmitter 88 is fed simultaneously to the E and H arms of the Tee 87; and the unilateral property of the Tee is such that the sum of the energy in the E and H arms is propagated down one of the colinear arms which is connected in turn to the antenna 89.

Another property of the Tee 87 is that the difference in energy in the E and H arms is propagated down an opposite colinear arm, and this second colinear arm is connected to the receiver 90 comprising a crystal detector 91 and video amplifier 92. If the E and H arms of the Tee 87 are fed equally, no transmitted energy propagates to the receiver 90 and this, therefore, provides isolation of the transmitter 88 from the receiver 90; while simultaneously providing for feeds to the antenna 89. When a received signal enters the arm coupled to antenna 89, it propagates freely through the two colinear arms of the Tee 87 to the receiver 90.

For mixing action of the local transmitter signal with the received signal, which takes place at the crystal detector 91, a small proportion of the transmitter signal is allowed to feed through the magic Tee 87 via an attenuator 93; and this attenuated signal slightly unbalances the E and H arm feeds so that a small transmitted signal propagates to the crystal detector 91 along with the receiver signal, thereby to permit addition of the two signals to take place. The crystal detector 91 causes a mixing of the two signals to take place, and the said detector 91 produces a beat signal at the difference frequency of the transmitted and received signals, which beat signal is then amplified by a video amplifier 92.

Reference is now made to FIGURE 13 which illustrates how the FM beat signal contains the desired code, guidance and panoramic information. It will be noted that the frequency of the transmitted signal is illustrated in FIGURE 13a as a waveform $S_T$. The transmitter transmits a CW signal which is frequency modulated by an FM modulator 94 (see FIGURE 12), whereby the signal $S_T$ varies in frequency as a triangular function of time, with a maximum frequency deviation of $\Delta F$, and at a rate of $f_m$. If some object exists at an arbitrary range in the antenna beam, a signal will be received and the received signal will necessarily undergo the same frequency variations as the transmitted signal. However, the changes in frequency will be delayed, with respect to the instantaneous transmitter frequency, by the time required for signal transmission to the target and return. If we should assume that the arbitrary range is D, then the amount of delay is $2D/C$ (where C is the speed of light), as shown for the received signals $S_{R_1}$ and $S_{R_2}$ (see FIGURE 13), corresponding respectively to objects at different ranges $D_1$ and $D_2$.

The time delay causes a frequency difference to exist between the transmitted and received signals, and this is is illustrated in FIGURE 13a by the designations $f_{d_1}$ and $f_{d_2}$. FIGURE 13b shows the behaviors of the difference frequency $f_d$ for the two objects at the two different ranges $D_1$ and $D_2$. The signal from the crystal detector 91, which is amplified by amplifier 92, being the sum of the transmitted and received signals, thus includes the frequency $f_{d_1}$ and $f_{d_2}$; and since these difference frequencies are proportional to the ranges of the objects in the beam 82, the detection of any frequency components in the beat signal is equivalent to the detection of an object at the range associated with that frequency. Moreover, the magnitude of the frequency component is proportional to the magnitude of the return signal.

As has been mentioned previously, frequency filtering techniques can be used to separate guidance code line and panoramic information, a function served by the double beam technique in the pulse radar example already described and illustrated. The frequency dependence of reflecting object range, and the difference in range of panoramic objects and the guidance line immediately in front of the vehicle, directly affords a principle which will effect this separation.

Thus, referring to FIGURE 11, it will be seen that a range $D_0$ has been illustrated which corresponds to a particular slant range between the radiating antenna and the road. The point of intersection of the slant range $D_0$ and ground is chosen to be some nominal short distance $D_0'$ in front of the vehicle; and it is expected that the road, in a distance less than the value of $D_0'$, will contain only the guidance line. At a distance greater than $D_0'$ there will be panoramic detail, for example other vehicles, intersections, etc. on the road, and incidentally, the guidance line. By employing frequency filters, therefore, to discriminate between the beat frequencies associated with ranges greater and less than $D_0'$, separation of panoramic and guidance line information can be effected.

The arrangement of FIGURE 12 takes the foregoing features into consideration; and in particular, the signal at the output of video amplifier 92 is transmitted to a high-pass filter 95 as well as to a low-pass filter 96. The high-pass filter 95 passes only those difference frequencies which are associated with ranges greater than the slant range $D_0$, and therefore the output of the said filter 95 can be considered to comprise a panoramic channel. It is desired to detect and separate each frequency component to be displayed as a separate object on an appropriate panoramic indicator. For this purpose circuits of a conventional spectrum analyzer 97 can be employed. In particular, the filtered beat signal appearing at the output of filter 95 is coupled to a mixer 98 which is also energized by a local oscillator signal produced by oscillator 99. The output signal of the mixer 98 is transmitted to a sharply tuned audio bandpass filter 100, and the local oscillator signal is frequency modulated by an FM sweep generator 101. If some particular frequency component appears in the output of filter 95 in synchronism with the FM generator frequency produced by generator 101, the beat signal between the signals coupled to mixer 98 will periodically be of the tuned frequency of the audio bandpass filter 100; and this beat frequency can then be rectified by a second crystal detector 102 and transmitted to the intensity modulation grid of an appropriate panoramic indicator 103.

The signals passed at any particular time by the narrow bandpass filter have a constant frequency difference (the bandpass center frequency) with respect to the output of local oscillator 99. The output of said oscillator 99 is proportional in frequency to the range of the object signal being detected. Inasmuch as the output of oscillator 99 is caused to vary under the control of FM sweep generator 101, the said sweep generator 101 output actually comprises a convenient time base for the range sweep of the panoramic indicator 103 and is so employed in the arrangement of FIGURE 12. The system also includes a lobing generator or lobing phaser 85, as discussed in reference to FIGURE 11, and inasmuch as the output of this generator 85 is proportional to the azimuth angle of the antenna beam, it is therefore proportional to the angular direction of an object when detected. This output of generator 85 is therefore also coupled to the panoramic indicator via a line 104 to provide the necessary time base for angle sweep circuits of the said panoramic indicator.

As mentioned previously, the frequency filtering technique employed for separating guidance code line and panoramic information, contemplates that signals also be coupled to a low-pass filter 96; and filter 96 is so chosen that it transmits only those frequencies which are associated with a range less than the slant range $D_0$. Thus, each time the beam scans across the road, the guidance line is intercepted and produces an output signal which appears at the output of said filter 96.

For direction error detection, the range of different portions of the guidance line are of no interest, and it is only the time of interception of the guidance line with respect to the antenna beam position which is important. Thus, recognition of the individual frequency components of the signal output of filter 96 is unimportant; and the low-pass filter 96 is followed immediately by a second detector 105, and a pulse shaping network comprising a second low-pass filter 106 and a pulse forming network 107. The signal output of pulse forming network 107 in fact takes the same form as the signal already described in reference to FIGURE 7b, and said signal can be utilized to develop a direction control signal in precisely the same manner as was described in the pulse radar example. Reference is accordingly made to the preceding discussion for a description of the manner in which direction control can be effected.

Code reading is also accomplished in a manner generally similar to that already described; and again knowledge of the frequency components in the detected signal is of no interest. The output of the second detector 105 comprises a signal containing any coded information which may be detected during the scanning of beam 82, and this signal is first transmitted to an azimuth gating circuit 108 which is controlled by lobing generator 85, thereby to assure that only signals near the guidance line are transmitted to the decoder. This arrangement therefore minimizes any possible false code signals which might be produced by objects unrelated to the actual code markings; and the output of azimuth gate 108 is, as mentioned previously, coupled to a decoder which translates the code into an appropriate display signal.

The decoder itself comprises a binary reader 109, a proportional storage unit 110 and a ten-cycle counter 111. The unit 110 may be of the type described in the text Magnetic Recording, by S. J. Begun, published by Rinehart & Co.; while the counter 111 may take the form described in the text Pulse and Digital Circuits, by Millman et al., published by McGraw-Hill Book Co. Let us assume, for purposes of illustration, that the coded pattern is similar to that illustrated for example in FIGURE 2g, comprising a plurality of segments spaced to one side of, and extending generally parallel to, the guidance line. When the beam 82 scans from the left-to-right edge of the road across the guidance line, the decoder is gated open by a signal from lobing generator 85. If reflective code strips are present in the code positions on the road, the binary code reader 109 reads the binary code and holds the reading until the beam completes a cycle and returns to the left edge of the road. The reader is then reset and a new reading is made.

During each right-to-left sweep of the cycle each binary code, i.e. a sequence of pulses or no pulses, is stored proportionally into the proportional storage unit 110. This operation of counting and storing is repeated for a number, e.g. ten cycles, so that the principle of proportional storage, already described in reference to FIGURE 10, can be effectively employed to alleviate possible errors in reading of the code. At the end of ten operations, the ten-cycle counter 111 actuates the storage unit 110 to effect a transfer of the stored code into a translator 112, thereby to produce an appropriate indication on the W indicator 113.

As will be appreciated from the entire foregoing discussion, the present invention is so arranged that various signals are produced during operation of the radar apparatus, and, as has been mentioned in reference to FIGURE 1, some of these signals are preferably coupled to a computer 18, whereby the said computer, in cooperation with other signals produced by the vehicle itself, can effect appropriate vehicle control. In order that this portion of the invention may be more fully appreciated, reference is now made to FIGURES 14 through 17 which illustrate one form of computer control constructed in accordance with the present invention.

Various of the signals which can be derived as a result of the radar apparatus have already been described. These include direction error signals, range signals, range rate signals and the like. These signals can, in normal course, be supplemented by further signals derived from mechanisms on the vehicle itself. By way of example, the vehicle may include a tachometer or speedometer, and may in addition include an accelerometer and a rate gyro giving signals relating to the actual operation of the vehicle. The system, as described for instance in reference to FIGURE 1, may also include a control box adapted to produce signals relating to the form of speed and direction control desired by the operator of the vehicle, as well as to the speed desired under automatic operating conditions.

The function of the computer is, of course, to process all of these signals and to issue proper control signals to the steering system, engine and brake, so as to perform the desired speed and direction control of the vehicle. Moreover, as has been mentioned previously, it is preferable to include a form of interacting control wherein, under some circumstances which may be encountered under normal driving conditions, the speed control of the vehicle is taken over by the direction control loop. These various control functions are achieved by the computer 18 and, as will become apparent, the principle of feedback control is applied to achieve the speed and direction control desired.

Referring now to FIGURE 14, which comprises essentially a functional block diagram of the overall vehicle arrangement including certain elements already described, it will be noted that the radar apparatus has been designated as 114a and 114b, relating respectively to the direction and speed control functions of the overall radar control system. The radar portion 114a, i.e. the direction control portions of the radar, cooperates with the guidance line 115 to give direction error signals in the manner already described, and these error signals are coupled to a direction control loop 116. This direction control loop, which may operate to control power steering apparatus, is further controlled by a steering wheel 117 having an override control switch, as will be described, whereby the direction control loop 116 effectively controls the car or vehicle direction.

The radar portion 114b, i.e. the speed control portions of the radar, is coupled to a coded speed command generator 118 which feeds a selection circuit 119; and the control box 23 also feeds said selection circuit 119 via a preselected speed command generator 120. The output of selection circuit 119 is coupled to a difference amplifier 121, and said difference amplifier 121 also receives signals from the direction control loop 116 via an interacting control circuit 122. Difference amplifier 121 in turn feeds a speed control loop 123 which receives other signals from the vehicle accelerator 124 and from the vehicle brake pedal 125, each of which may include override control switches whereby this latter portion of the overall system operates to control wheel speed.

As will be apparent from an examination of FIGURE 14, therefore, both car direction and speed are controlled, and an interacting control circuit is provided to relate these two functions to one another under selected operating conditions.

Examining the overall system of FIGURE 14 in somewhat greater detail, and making reference in addition to FIGURES 15 through 17, it should first be noted that the function of the speed control loop 123 is to process those signals which are derived in connection with the speed control, and to issue control signals so as to perform speed control of the vehicle. There are actually three modes of operation in the system, namely the manual mode, the automatic mode, and the override control mode. In the automatic mode, the signals from the radar 114b and from the control box 23 are sent respectively to the coded speed command generator 118 and to the preselected (e.g. by push-button) speed command generator 120; and the outputs of these two generators 118 and 120 are sent to a selection circuit 119. The selection circuit is operative to select the proper command, and then to send it to the difference amplifier 121 which is operative to subtract any command of speed reduction, by the direction control loop 116, effected through the interacting control circuit 122. The output of the difference amplifier 121, therefore, comprises the real command to the speed control loop 123. This command signal, at the output of difference amplifier 121, goes through two further difference amplifiers 126 and 127 in sequence, and the first of said difference amplifiers 126 is operative to subtract a speed signal derived from tachometer 128, while the second of said difference amplifiers is operative to subtract a further signal derived from accelerometer 129. The acceleration signal is in fact utilized to improve the stability of the speed control loop.

The output of difference amplifier 127 is therefore a combined speed error signal, the magnitude and polarity of which is responsive to signals derived from the radar as well as to further signals derived from both the accelerometer and tachometer on the vehicle itself. If the resultant error signal produced by difference amplifier 127 is positive, it is sent to the engine channel to speed up the vehicle, while if it is negative, it is sent to the brake channel to slow down the vehicle. This separation of positive and negative error signals is achieved by the positive and negative clipping circuits 130 and 131. The positive portion of the speed error signal, if it exists, is sent through an amplifier and servo-motor 132 to the throttle control 133 of the vehicle; while any negative portion is similarly sent through an amplifier and servo-motor 134 to a power braking apparatus 135.

Two-position switches 136 and 137 are provided in the engine and brake channels of the vehicle respectively, and when these switches are in their "automatic" position, the system is in its automatic mode. When the switches are in their "manual" and "override" control positions, the system is either in its manual or override mode. The switches 136 and 137 may in fact comprise a portion of the control box 23, and are so indicated in FIGURE 1. When the system is in its override control mode, the switches return to the automatic mode as soon as the overriding switches are no longer actuated. This differs from the manual mode in that the switch remains at a manual position in that latter mode. The overriding switches may be installed on the accelerator and on the brake pedal, so that they are actuated when the driver steps on either. It should particularly be noted that when the vehicle is caused to operate in either its manual or override control modes, the speed control loop is broken.

The preselected speed command generator 120 and the speed comman selection circuit 119, are illustrated in FIGURE 16. The circuit 120 includes a switch 138 which may be set to any one of a plurality of positions to select any one of a plurality of different voltages deriver from source 139 coupled across resistor 140. Let us assume that the voltage so selected by switch 138 is termed $e_m$, this voltage being the actual preselected speed command signal. Let us also assume that a voltage $e_d$ is provided, this corresponding to the coded speed command signal derived from code markings on the road via radar portion 114b and produced by the coded speed command generator 118. The voltage $e_m$ is coupled via a selection diode 141 to the anode of a switching and amplification triode 142; and the coded speed command signal is coupled to the control grid of said triode 142. Let us further assume that $e_p$ is the plate signal of the triode 142, and that $e_o$ is the output signal of the selection 119.

It will be apparent that there are two typical cases for the operation of the circuit shown in FIGURE 16; one wherein there is no $e_d$ (no speed command signal is derived from code markings on the road); and the other in which $e_d$ is present. When there is no $e_d$, triode 142 is biased to cut-off from source 143 wherefore it does not conduct. The selection diode 141 does conduct, however, by an amount selected by switch 138; and $e_o$, the output of the selection circuit, will be equal to $e_m$, that is, the speed command output of circuit 119 is that command which is preselected at the control box 23.

When $e_d$ is present, however, the triode 142 operates as an amplifier. The plate voltage $e_p$ of the said amplifier accordingly changes inversely in relation to the magnitude of $e_d$. Two conditions occur: first, when $e_d$ is greater than $e_m$, the selection diode 141 is still conducting and $e_o$ is still equal to $e_m$. This particular condition may be considered to be one wherein the preselected speed command signal is less than the coded speed command, whereby the vehicle operates at the selected speed command. The second condition, however, occurs when $e_d$ is less than $e_m$; and under this second possible condition the selection diode 141 is not conducting and $e_o$ becomes equal to $e_d$, i.e. the speed command of the vehicle is now derived from the coded speed command provided in conjunction with the guidance line, or the like. As a result of this circuit, therefore, the speed control of the vehicle is taken over by the code on the guidance line, if the preselected car speed, as selected by the vehicle operator, is larger than the signal prescribed for a given section of road as determined by the code markings on that section.

The direction control loop 116 functions, as mentioned previously, to process the radar direction error signal and to issue direction control signals so as to perform direction control of the vehicle. Again, there are three modes for the operation of the direction control loop, these being respectively the manual mode, the automatic mode, and the override control mode. In the automatic control mode, the radar portion 114a generates direction error signals from the guidance line 115, in the manner already described, and these error signals are sent to a difference amplifier 144 which also receives inputs from a yaw rate gyro 145. The yaw rate gyro is in fact provided to improve the stability of the direction control loop, and the signals derived from units 114a and 145 are subtracted from one another in difference amplifier 144, whereby the output of said difference amplifier 144 is a combined direction error signal which is thereafter sent through an amplifier 146 and servo-motor 147 to the steering mechanism or power steering apparatus 148.

Again, as was the case in the speed control loop, a two-position switch 149 is provided at the input to amplifier 146, and when said switch 149 is in its "automatic" position, the system is in the automatic mode; whole when the switch is in its "manual" and "override" control positions, the system is in either manual or override mode. The switch 149 may again be provided as a portion of the control box 23. In the override control mode, the switch 149 is so constructed that it will return to the automatic mode as soon as the overriding switch is no longer actuated; and this differs again from the operation of the switch in the manual mode in that the switch remains at the manual position when the manual mode is selected. The overriding switch may be installed on the rim of the steering wheel so that it is actuated when the driver grasps the same; or, in the alternative, it may be provided as a portion of the steering apparatus itself, whereby the operator of the vehicle must apply a certain minimum pressure on such steering apparatus before the override switch is actuated.

It should be noted again that when the switch is caused to move to its manual and override control modes, either by selection of manual operation from the control box 23, or through selection of the override mode upon operation of the steering wheel, the direction control loop is broken.

The interacting control circuit 122 operates so as to cause the direction control loop to take over the speed control loop of the vehicle under certain road conditions. By way of example, when the vehicle travels at a preselected speed which is too high for a sudden turning along a curve, the direction control loop may take over the speed control to reduce the car speed to a proper level. In general, any driving condition which causes an unsually large direction error signal will cause the speed control of the vehicle to be temporarily taken over by the direction control loop.

More particularly, when an unusually large direction error signal does occur, it is preferably coupled to a function generator, such as a diode function generator, having an input (combined direction error signal) and output (speed reduction signal) characteristic of the type shown in FIGURE 17. When the direction error signal is maintained within predetermined limits, indicated by 150, there is no output in the interacting control circuit, wherefore there is no interaction between the speed and direction control loops. If, however, the direction error signal should exceed the limits of range 150, a signal proportional to the desired speed reduction will be produced at the output of the interacting control circuit 122. This signal, as described previously, subtracts from the speed command signal produced at the output of selection circuit 119 whereby the command speed to the speed control loop is reduced, and the speed control is temporarily taken over by the direction control loop.

It will be appreciated, of course, that the particular linear characteristic for a circuit, as shown in FIGURE 17, can be derived from any of many known circuits; and it will further be appreciated that, from a functional point of view, the characteristic of the circuit described in reference to FIGURE 17 can be other than linear, and can take other desirable forms such as parabolic characteristics.

While we have thus described preferred embodiments of the present invention, many variations will be suggested to those skilled in the art; and it must therefore be emphasized that the foregoing description is meant to be illustrative only and should not be considered limitative of our invention. All such variations and modifications as are in accord with the principles described, are meant to fall within the scope of the appended claims.

Having thus described our invention, we claim:

1. In combination, a roadway having control information thereon in the form of radiation reflective surfaces extending along said roadway at limited portions thereof, a moving vehicle on said roadway, and means on said vehicle for controlling the movement of said vehicle along said roadway comprising radar means for transmitting beamed radiation toward said roadway, means for regularly scanning said beam across said roadway into and out of contact with said radiation reflective surfaces thereby to produce discrete spaced echo signals whenever said beam is swept into contact with said surfaces, receiving means on said vehicle responsive to the relative times of occurrence of successive ones of said echo signals reflected from said radiation reflective surfaces during scanning of said beam for producing a control signal, and signal responsive steering means on said vehicle responsive to said control signal for selectively varying the direction of movement of said vehicle along said roadway.

2. In a moving vehicle adapted to operate automatically on a roadway, means for controlling the movement of said vehicle on said roadway comprising radar means on said vehicle for radiating a dual beam in advance of said vehicle, one of said beams being directed toward said roadway at a range relatively close to said vehicle, the other of said beams being directed in advance of said vehicle to ranges relatively far from said vehicle, receiver means on said vehicle including means for segregating echo signals received from both said beams, control means responsive to echo signals received from one of said beams for controlling the movement of said vehicle along said roadway, and indicator means responsive to signals received from the other of said beams for indicating roadway conditions in advance of said vehicle.

3. The combination of claim 2, wherein said control means comprises direction control means operative to control the steering of said vehicle along said roadway.

4. The combination of claim 2, including radiation reflective surfaces disposed in coded arrays on said roadway, said receiver means including decoder means responsive to coded sequences of echo signals reflected by said arrays for producing control signals controlling the movement of said vehicle along said roadway.

5. The combination of claim 4, including means on said vehicle for generating a preselected control voltage, said vehicle including signal responsive speed control means, and means for comparing the magnitudes of said preselected control voltage and said control signals for producing an output signal operative to control said speed control means.

6. The combination of claim 2, wherein said vehicle includes means responsive to the echo signals received from one of said beams for producing a direction control error signal, means responsive to said error signal for controlling the steering of said vehicle, and means responsive to generation of a direction control error signal having a magnitude greater than a predetermined value for reducing the speed of said vehicle.

7. The combination of claim 2, wherein said control means is operative to automatically control both the direction and speed of said vehicle, and vehicle operator controlled means for selectively overriding either of said automatic controls.

8. In a moving vehicle adapted to operate automatically along a preselected path of travel defined by radiation reflectve surfaces extending along said path, means for controlling the direction of movement of said vehicle comprising radar means on said vehicle for transmitting beamed energy in advance of said vehicle toward said radiation reflective surfaces, means for regularly scanning said beam transverse to the path of movement of said vehicle into and out of contact with said radiation reflective surfaces whereby said beam contacts said radiation reflective surfaces at spaced time intervals during said scanning thereby to reflect energy back to said vehicle,, means on said vehicle for establishing a reference timing signal related to the regular scanning of said beam, receiver means on said vehicle responsive to said received energy, said receiver means including means for determining the times of occurrence of said beam contacts with said radiation reflective surfaces and for comparing said determined times of occurrence with said reference timing signal to generate a direction error control signal, and steering means responsive to said direction error control signal for controlling the steering of said vehicle.

9. The combination of claim 8, wherein said radar means includes means operative to transmit spaced pulses of energy.

10. The combination of claim 8, wherein said radar means includes means operative to transmit a frequency modulated carrier wave.

11. In combination, a roadway having radiation reflective surfaces, a moving vehicle on said roadway, said vehicle including a radio frequency source radiating a beam of energy in advance of said vehicle and toward said reflective surfaces, means for sweeping said beam across the path of movement of said vehicle whereby said surfaces reflect an energy pulse toward said vehicle each time said beam sweeps into contact with said surfaces, a source of reference timing signals on said vehicle, comparing means in said vehicle for comparing the times of occurrence of said reflected energy pulses with the times of occurrence of said reference timing signals for detecting variations in time between reception of successive ones of said pulses at said vehicle, and means responsive to said time variation detection for controlling the movement of said vehicle.

12. The combination of claim 11, wherein said comparing means includes means responsive to said variations in reception time for producing a direction error control signal, and means responsive to said error signal for controlling the steering of said vehicle.

13. The combination of claim 11, wherein said beam of energy comprises spaced energy pulses.

14. The combination of claim 11, wherein said beam of energy comprises a frequency modulated carrier wave.

15. In combination, a roadway, a moving vehicle on said roadway, means on said vehicle for controlling the movement of said vehicle along said roadway comprising signal responsive vehicle direction control means and further signal responsive vehicle speed control means, transmitting means on said vehicle for transmitting a beam of radiation toward said roadway and for regularly scanning said beam across portions of said roadway in advance of the path of movement of said vehicle whereby echo signals are reflected back toward said vehicle when said scanned beam of transmitted radiation impinges on predetermined portions of said roadway, receiving means on said vehicle responsive to said echo signals for producing first and second distinct control signals, means coupling said first and second control signals to said vehicle direction and speed control means respectively thereby to control both the direction and speed of said moving vehicle, said receiving means including computer means responsive to said echo signals, operator controlled means on said vehicle for producing further signals, and means coupling said further signals to said computer means whereby said first and second control signals are dependent upon both operator control of said vehicle and upon movement of said vehicle along said roadway.

16. In a moving vehicle adapted to operate automatically on a roadway, means for controlling the movement of said vehicle on said roadway comprising radar means on said vehicle for radiating energy in advance of said vehicle, said radiated energy including a first portion directed toward said roadway at a range relatively close to said vehicle, and a second portion directed in advance of said vehicle to ranges relatively far from said vehicle, receiver means on said vehicle including means for segregating echo signals received from both said portions, and control means including a computer device responsive to said echo signals for controlling the movement of said vehicle along said roadway.

17. The combination of claim 16 wherein said computer means includes storage means for storing said echo signals and for producing control signals, operative to effect said movement control, at a time subsequent to initial reception of said echo signals.

18. In combination, a roadway, a moving vehicle on said roadway, means on said vehicle for controlling the movement of said vehicle along said roadway comprising signal responsive vehicle direction control means and further signal responsive vehicle speed control means, transmitting means on said vehicle for transmitting a beam of radiation toward said roadway in advance of the path of movement of said vehicle, said transmitting means including means for scanning said beam across a path transverse to the direction of movement of said vehicle whereby echo signals are reflected back toward said vehicle when said scanned beam of transmitted radiation impinges on predetermined portions of said roadway, receiving means on said vehicle responsive to said echo signals for producing distinct direction and speed control signals, means coupling said direction control signals to said vehicle direction control means thereby to control the direction of movement of said moving vehicle, means coupling said speed control signals to said vehicle speed control means for controlling the speed of said moving vehicle, and circuit means coupled to both said direction and speed control means and responsive to the occurrence of direction control signals requiring relatively large changes in the direction of movement of said vehicle for overriding said speed control signals and for reducing the speed of said vehicle whereby the speed control of said vehicle is temporarily assumed by said direction control signals.

19. In a moving vehicle adapted to operate automatically on a roadway, means for controlling the movement of said vehicle on said roadway comprising radar means on said vehicle for radiating beamed energy in advance of said vehicle, said radiated energy including a first portion directed toward said roadway at a range in advance of but relatively close to said vehicle, and a second portion directed in advance of said vehicle to ranges relatively far from said vehicle, means for periodically scanning said beamed energy across said roadway, receiver means on said vehicle responsive to echo signals returned to said vehicle during the scanning of said beamed energy, said receiver means including means for segregating echo signals received from said first and second portions into a pair of distinct groups of echo signals, control means on said vehicle responsive to echo signals in one of said groups for controlling the movement of said vehicle along said roadway, and indicator means on said vehicle responsive to echo signals in the other of said groups for indicating roadway conditions in advance of said vehicle.

20. In combination, a roadway having speed limit information thereon in the form of radiation reflective surfaces extending along said roadway at limited portions thereof, a moving vehicle on said roadway, control means on said vehicle for controlling the speed of movement of said vehicle along said roadway comprising operator controlled means on said vehicle for selecting and normally maintaining a desired speed for said vehicle, said control means further including signal responsive vehicle speed control means, a radar apparatus including transmitting means on said vehicle for transmitting radiation toward said roadway in advance of the path of movement of said vehicle whereby echo signals are reflected back toward said vehicle when said transmitted radiation impinges on said radiation reflective surfaces, said radar apparatus including receiving means on said vehicle responsive to said echo signals for producing a control signal indicative of the speed limit on said roadway, and means coupling said control signal to said signal responsive speed control means for automatically reducing the speed of said moving vehicle when said selected speed is in excess of said speed limit.

21. In combination, a roadway having control information thereon in the form of an elongated guidance line as well as coded arrays of radiation reflective surfaces extending along said roadway at limited portions thereof, a moving vehicle on said roadway, control means on said vehicle for controlling the movement of said vehicle along said roadway comprising radar means for transmitting beamed radiation toward said roadway, receiving means on said vehicle responsive to echo signals reflected from said guidance line upon transmission of said beam for producing a first control signal, means on said vehicle responsive to said first control signal for selectively varying the direction of movement of said vehicle along said roadway, said receiver means including decoder means responsive to coded echo signals received at said vehicle in response to transmission of said beam into contact with one of said coded arrays for producing a second control signal, operator controlled means on said vehicle for producing a third control signal related to a desired speed for said vehicle, and means on said vehicle coupled to both said decoder means and said operator controlled means, and jointly responsive to both said second and third control signals, for controlling the speed of said vehicle.

22. In a moving vehicle adapted to operate automatically on a roadway having information thereon in the form of radiation reflective surfaces located at different ranges in advance of said vehicle, means for controlling the movement of said vehicle on said roadway comprising radar means on said vehicle for transmitting and scanning a beam of radiation across said roadway in advance of said vehicle into and out of contact with said radiation reflective surfaces, receiver means on said vehicle including means for segregating echo signals received from radiation reflective surfaces located at different ranges in advance of said vehicle, control means responsive to the segregated echo signals received from said radiation reflective surface located at a first range in advance of said vehicle for controlling the movement of said vehicle along said roadway, and indicator means responsive to the segregated echo signals received from said radiation reflective surface located within a second range, greater than said first range, in advance of said vehicle for indicating roadway conditions in advance of said vehicle.

23. The combination of claim 22, wherein said radiation reflective surfaces comprise an edge of said roadway.

24. The combination of claim 22, wherein said radiation reflective surfaces comprise auxiliary reflective material on said roadway.

25. In combination, means for defining a desired path of vehicle travel comprising control information in the form of radiation reflective surfaces extending along said path at limited portions thereof, a moving vehicle on said path, said vehicle having a steering apparatus, means on said vehicle for automatically guiding the movement of said vehicle along said path comprising signal responsive vehicle direction control means on said vehicle coupled to said steering apparatus, a radar apparatus on said vehicle, said radar apparatus including transmitting means for transmitting beamed radiation toward said path in advance of said vehicle whereby echo signals, indicative of path conditions relative to and in advance of said vehicle, are reflected back toward said vehicle when said transmitted radiation impinges on portions of said radiation reflective surfaces at preselected ranges in advance of said vehicle, said radar apparatus also including receiving means on said vehicle for storing said signals and for, at a later time, using said stored echo signals to produce control signals varying with variations in the position of said vehicle relative to said advance located portions of said radiation reflective surfaces, and means coupling said control signals to said vehicle direction control means whereby said control means is operative to anticipate said advance path conditions thereby to control said steering apparatus and to guide said moving vehicle along said path.

References Cited in the file of this patent

UNITED STATES PATENTS

| | | |
|---|---|---|
| 2,074,251 | Braun | Mar. 16, 1937 |
| 2,493,755 | Ferrill | Jan. 10, 1950 |
| 2,513,279 | Bradley | July 4, 1950 |
| 2,702,342 | Korman | Feb. 15, 1955 |
| 2,750,583 | McCullough | June 12, 1956 |
| 2,804,160 | Rashid | Aug. 27, 1957 |
| 2,841,782 | McIlwain | July 1, 1958 |